(12) United States Patent
Ejima et al.

(10) Patent No.: US 12,454,548 B2
(45) Date of Patent: Oct. 28, 2025

(54) METHOD FOR PRODUCING REFOLDED PROTEIN BY USING FLOW MICROREACTOR, AND PROTEIN REFOLDING APPARATUS

(71) Applicant: AJINOMOTO CO., INC., Tokyo (JP)

(72) Inventors: Daisuke Ejima, Kawasaki (JP); Yuichi Nakahara, Kawasaki (JP); Keisuke Kato, Kawasaki (JP); Masayo Date, Kawasaki (JP)

(73) Assignee: AJINOMOTO CO., INC., Tokyo (JP)

( * ) Notice: Subject to any disclaimer, the term of this patent is extended or adjusted under 35 U.S.C. 154(b) by 1122 days.

(21) Appl. No.: 17/308,594

(22) Filed: May 5, 2021

(65) Prior Publication Data

US 2021/0253629 A1 Aug. 19, 2021

Related U.S. Application Data

(63) Continuation of application No. PCT/JP2019/043284, filed on Nov. 5, 2019.

(30) Foreign Application Priority Data

Nov. 5, 2018 (JP) .................. 2018-208214

(51) Int. Cl.
*C07K 1/113* (2006.01)
*B01J 19/24* (2006.01)

(52) U.S. Cl.
CPC .......... *C07K 1/1136* (2013.01); *B01J 19/245* (2013.01)

(58) Field of Classification Search
CPC . B01F 33/00; B01F 33/30; B01J 19/00; B01J 19/0093; B01J 19/24; B01J 19/245; B01J 2219/00; B01J 2219/00784; B01J 2219/00851; B01J 2219/00858; B01J 2219/0086; B01J 2219/00873; B01J 2219/00889; C07K 1/00; C07K 1/107; C07K 1/113; C07K 1/1136

See application file for complete search history.

(56) References Cited

U.S. PATENT DOCUMENTS

| 6,677,432 | B1 | 1/2004 | Oppermann et al. |
| 6,846,906 | B1 | 1/2005 | Oppermann et al. |
| 6,870,154 | B1 * | 3/2005 | Konermann ........ H01J 49/0431 250/281 |

(Continued)

FOREIGN PATENT DOCUMENTS

| JP | 2002-526115 A | 8/2002 |
| JP | 2009-502173 A | 1/2009 |

(Continued)

OTHER PUBLICATIONS

Extended European Search Report issued Jun. 14, 2022 in European Patent Application No. 19881844.5, 6 pages.

(Continued)

*Primary Examiner* — Natasha E Young
(74) *Attorney, Agent, or Firm* — Oblon, McClelland, Maier &Neustadt, L.L.P.

(57) ABSTRACT

The present invention provides a method for producing a refolded protein, the method comprising a step for mixing, inside a micro mixer, a buffer and a solubilization solution for a protein that has lost higher order structure or that has become insoluble.

5 Claims, 8 Drawing Sheets

(56) References Cited

U.S. PATENT DOCUMENTS

| | | |
|---|---|---|
| 7,651,848 B2 | 1/2010 | Schlegl |
| 2005/0250936 A1 | 11/2005 | Oppermann et al. |
| 2007/0027305 A1 | 2/2007 | St. John et al. |
| 2007/0276131 A1* | 11/2007 | Ferre ............... C07K 14/70539 536/25.4 |
| 2009/0054628 A1 | 2/2009 | St. John et al. |
| 2012/0122778 A1 | 5/2012 | Oppermann et al. |

FOREIGN PATENT DOCUMENTS

| | | |
|---|---|---|
| WO | WO 2008/132651 A1 | 11/2008 |
| WO | WO 2016/116947 A1 | 7/2016 |

OTHER PUBLICATIONS

International Search Report issued Feb. 4, 2020 in PCT/JP2019/043284 filed on Nov. 5, 2019, 3 pages.

Mitic et al., "Microsecond time-scale kinetics of transient biochemical reactions", PLOS ONE, vol. 12, No. 10, e0185888, Oct. 3, 2017, 15 pages.

Shastry et al., "A Continuous-Flow Capillary Mixing Method to Monitor Reactions on the Microsecond Time Scale", Biophysical Journal vol. 74, May 1998, pp. 2714-2721.

Katoh et al., "Continuous refolding of lysozyme with fed-batch addition of denatured protein solution", Process Biochemistry 35, 2000, pp. 1119-1124.

Sharma et al., "Continuous refolding of a biotech therapeutic in a novel Coiled Flow Inverter Reactor", Chemical Engineering Science 140, 2016, pp. 153-160.

* cited by examiner

FIG. 1 - PRIOR ART
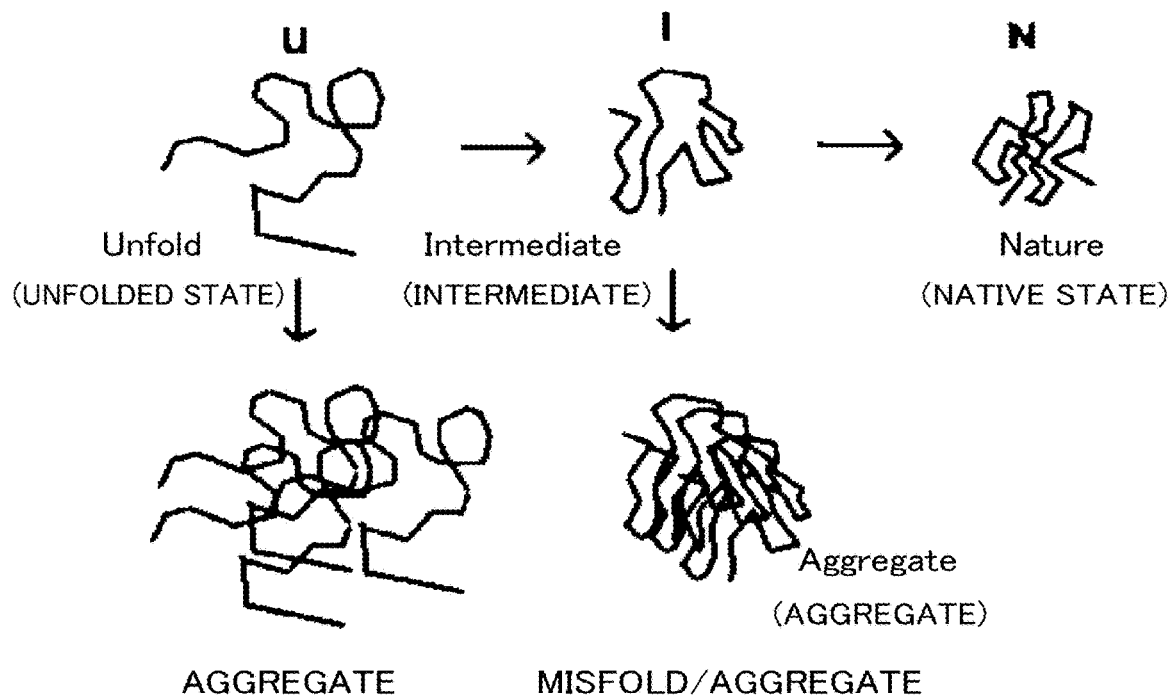
FIG.2A
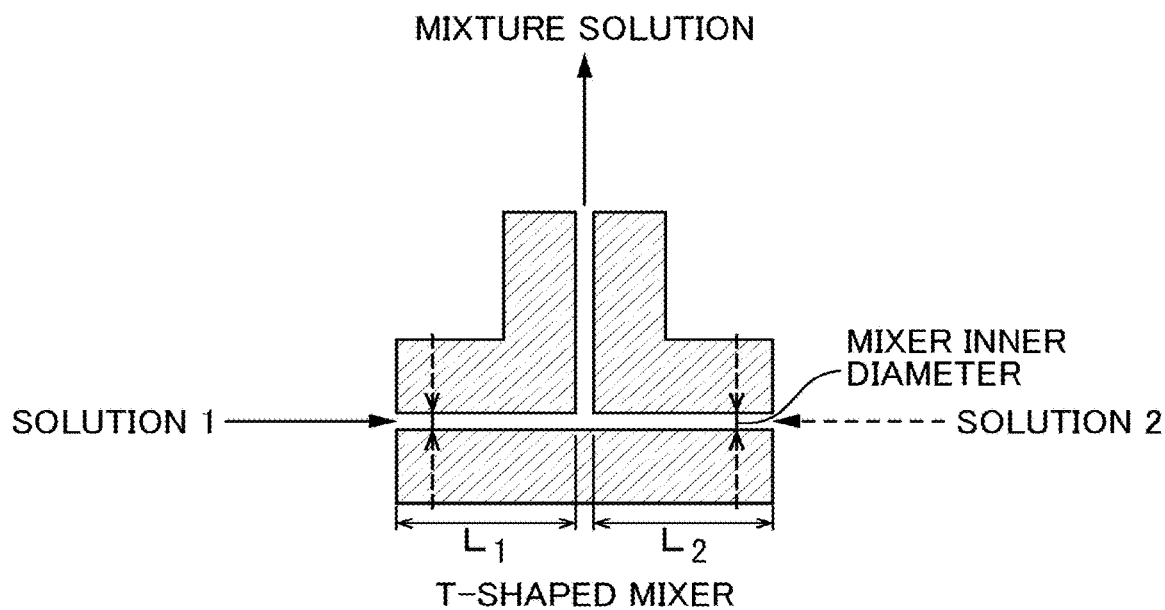

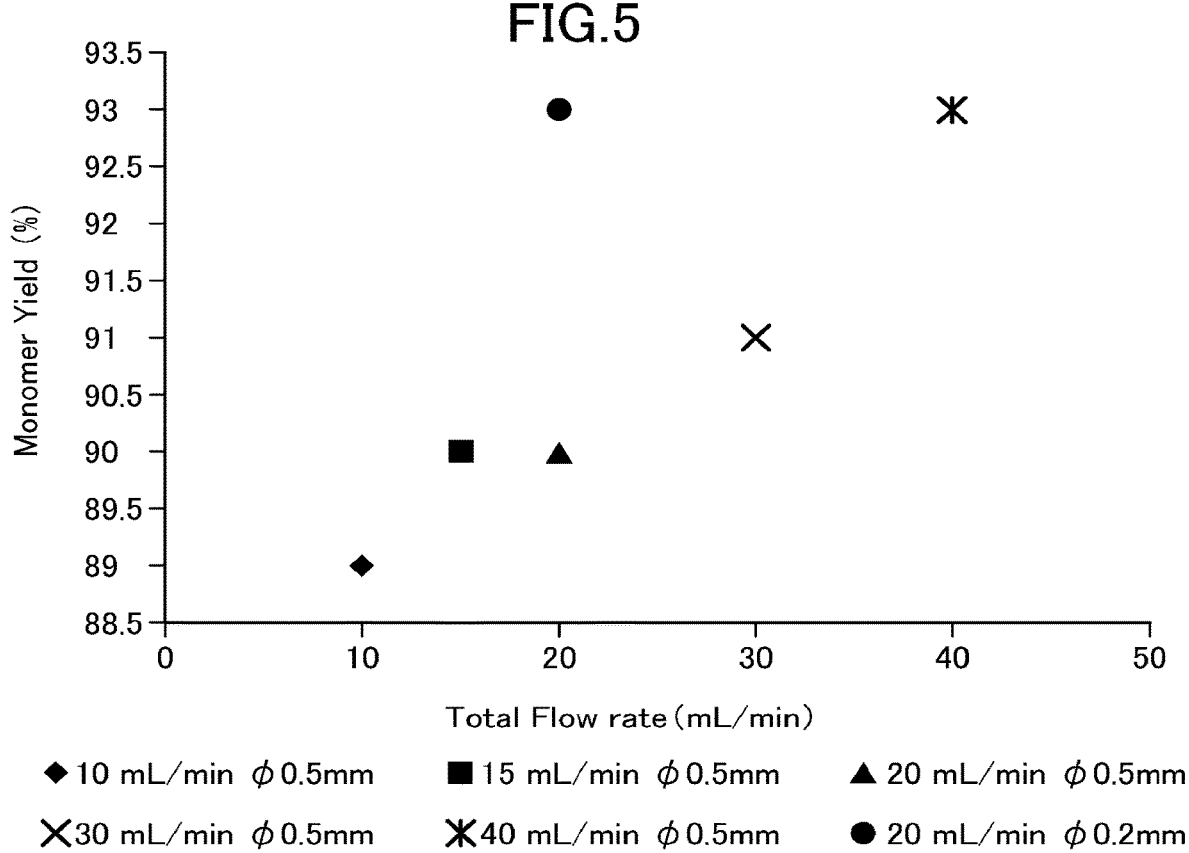
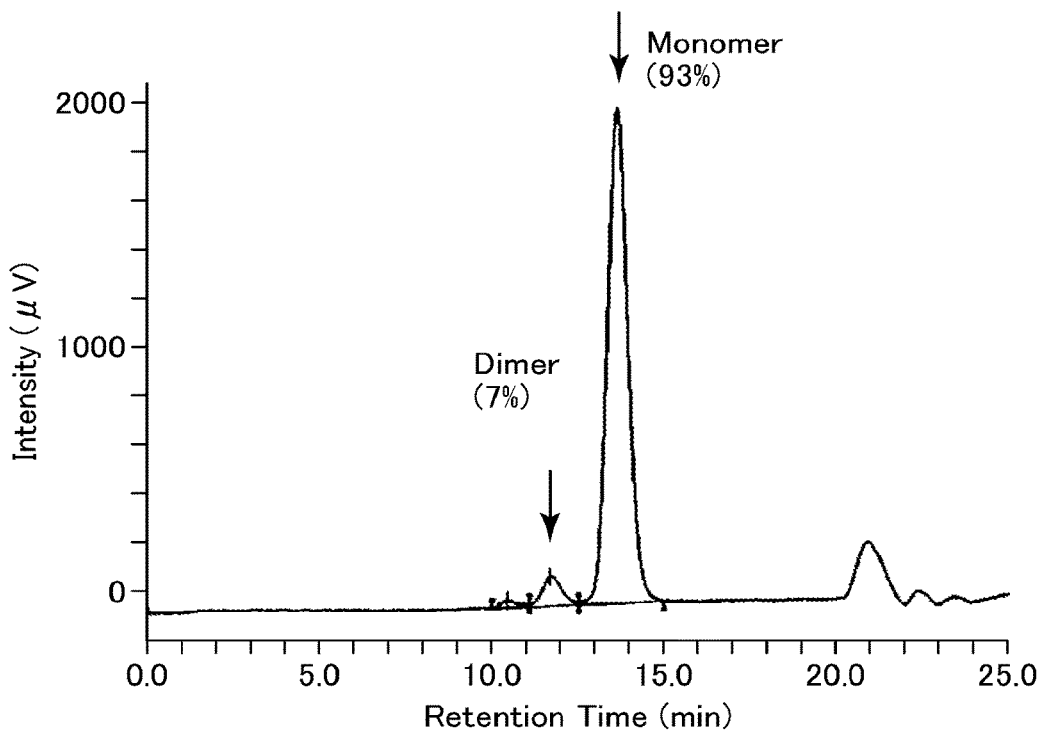

METHOD FOR PRODUCING REFOLDED PROTEIN BY USING FLOW MICROREACTOR, AND PROTEIN REFOLDING APPARATUS

This application is a national stage application, under 35 U.S.C. § 371, of PCT/JP2019/043284, now WO 2020/095894, filed Nov. 5, 2019, which claims benefit of Japanese Application No. JP2018-208214, filed Nov. 5, 2018, both of which are incorporated herein by reference in their entirety.

TECHNICAL FIELD

The present invention relates to a method for producing a refolded protein using a flow microreactor (FMR) and a protein refolding apparatus.

BACKGROUND ART

Proteins produced using microorganisms such as *Escherichia coli* are often insoluble in the microorganisms and lose their activity. Therefore, in order to make the protein thus obtained industrially applicable, it is necessary to perform refolding so as to achieve an appropriate three-dimensional structure with the aim of restoring the activity.

When performing refolding, the insoluble protein is usually solubilized with a suitable denaturant, and then the denaturant is removed to the extent that the protein restores its three-dimensional structure and restores activity. Known methods for removing the denaturant include column chromatography such as gel filtration chromatography, ultrafiltration, dialysis, and a combination thereof. It is desired to obtain only proteins with a structure having a stable chemical potential and having activity by refolding. However, during the removal of the denaturant, it may precipitate in a considerable amount, or it may take a structure having no activity even when dissolved in the aqueous phase after refolding. Hence, the yield of active protein still remains unsatisfactory.

As a technique for performing protein refolding at the industrial level, for example, Published Japanese Translation of PCT International Application No. 2009-502173 (Patent Literature 1) discloses a flow-type refolding method in which a solubilized protein solution and a dilution buffer are combined and then mixed more thoroughly with a static mixer for refolding, thereby reducing the shearing force of the stirring blades due to batch refolding and the stress due to heat.

U.S. Pat. No. 7,651,848 (Patent Literature 2, hereinafter referred to as "Patent No. 848") discloses a method for mixing a solubilized protein and a diluent with a static mixer, then receiving the refolding solution in a tank, and stirring the refolding solution in the tank. It is stated that the mixing time at this time is 1 millisecond to 10 seconds, and preferably 100 milliseconds to 1 second. Further, the methods disclosed include a method for combining additives after mixing with a static mixer, and a method in which a refolding tank for receiving the mixture liquid of a solubilized protein solution and a dilution buffer is filled with the dilution buffer in advance, and the mixture solution in the refolding tank is circulated to be used for diluting the solubilized protein solution.

Non Patent Literature 1 (Process Biochemistry 35 (2000) 1119-1124) discloses a system that feeds solubilized protein with a pump into a dialysis membrane tube while stirring the solubilized protein solution in the dialysis membrane tube, and keeps the concentration of solubilized substances low by constantly pulling out the dilution buffer while sending it out of the dialysis membrane tube.

Non Patent Literature 2 (Chemical Engineering Science 140 (2016) 153-160) discloses a continuous refolding system in which a solubilized protein solution and a dilution buffer are mixed, then passed through a static mixer, and thereafter passed through a reaction coil for refolding.

CITATION LIST

Patent Literatures

Patent Literature 1: Published Japanese Translation of PCT International Application No. 2009-502173
Patent Literature 2: U.S. Pat. No. 7,651,848

Non Patent Literatures

Non Patent Literature 1: Process Biochemistry 35 (2000) 1119-1124
Non Patent Literature 2: Chemical Engineering Science 140 (2016) 153-16

SUMMARY OF INVENTION

Problems to be Solved by the Invention

As described above, protein refolding is to restore protein functions by folding a denatured protein without protein functions into its original structure, and such structural changes can be caused by removing the denaturant or reducing the concentration of the denaturant to as low a level as possible. FIG. 1 is an addition to the explanation of each state in FIG. 4 of the literature of Tsumoto et al. (K. Tsumoto et al., Protein Expression and Purification 28 (2003) 1-8), and shows the process of refolding. As shown in this figure, refolding causes the protein to change from the unfolded state (U) through the intermediate (I) to the native state (N). However, it is said that the structure of a protein depends not only on the concentration of the denaturant but also on the surrounding environment such as pH and temperature to a large extent, and easily forms aggregates or becomes misfolded due to non-uniform mixing or the like (Y. Katoh et al., Process Biochemistry 35 (2000) 1119-1124). That is, a protein may change from the unfolded state (U) or the intermediate (1) to an aggregate. It is said that the time from the unfolded state (U) to the native state (N) or the aggregate is short and very fast (on the order of millisecond) (C. M. Dobson et al., J. Mol. Biol. (2000) 297, 193-210). Therefore, in order to suppress the formation of aggregates, it is considered important to achieve in a short time a state in which the denaturant is removed or a state in which the concentration of the denaturant is low (that is, high-speed mixing).

However, it takes a certain amount of time to remove the denaturant from the solubilized protein solution. For example, when the denaturant is removed by a dialysis operation, the moving speed of the substances passing through the dialysis membrane is slow, so that the time until the denaturant is removed becomes longer than the refolding time. Further, at the level of industrialization, in addition to the time required for dilution, there is a problem that the concentration tends to be locally non-uniform. For example, a static mixer is an excellent mixer, but since the diluted solution is once mixed with the solubilized solution of denatured protein and then introduced into the static mixer, non-uniformity is likely to occur both temporally and locally in the mixing up to the outlet of the static mixer.

Means for Solution of the Problems

The present inventors have earnestly studied a protein refolding method, and have found as a result that, by use of a flow microreactor equipped with a micromixer having an inner diameter of about 0.1 to about 1.0 mm, when a buffer and a solubilized solution of denatured protein are circulated at a predetermined flow rate and continuously mixed in the micromixer, it is possible to suppress the formation of aggregates and improve the yield of properly refolded protein. Based on this finding, the present invention has been completed. Specifically, the present invention provides the following production method.

[1] a Method for Producing a Refolded Protein, Including the Step of:
mixing a solubilized solution of a protein which has become insoluble or lost a higher-order structure thereof with a buffer in a micromixer.

[2] The production method according to 1 described above, wherein a mixing time determined by the following formula (I) is shorter than about 3 milliseconds (msec)

$$tm = 0.15\varepsilon^{-0.45} \quad (I),$$

where tm is the mixing time, $\varepsilon$ is an energy dissipation rate, Q is a flow rate, $\Delta P$ is a pressure loss, $\rho$ is a density, V is a mixer volume, and $\varepsilon = Q\Delta P/\rho V$.

[3] The production method according to 1 or 2 described above, wherein a total of a flow rate of the buffer and a flow rate of the solubilized solution of denatured protein is about 5 mL/min or more.

[4] The production method according to any one of 1 to 3 described above, wherein the total of the flow rate of the buffer and the flow rate of the solubilized solution of denatured protein is about 600 mL/min or less.

[5] The production method according to any one of 1 to 4 described above, wherein the pressure loss before and after the micromixer is about 1 kPa to about 10 MPa.

[6] The production method according to any one of 1 to 5 described above, wherein the mixing time in the micromixer is shorter than about 1 millisecond.

[7] The production method according to any one of 1 to 6 described above, wherein
the mixing step includes a step of mixing the solubilized solution and the buffer in a micromixer having an inner diameter of Y mm,
the mixing includes bringing the buffer at a flow rate of X1 mL/min into contact with the solubilized solution at a flow rate of X2 mL/min,
a relationship between X1 and Y is shown by the following formula (1), and
a relationship between X1 and X2 is shown by the following formula (2)

$$Y \leq \frac{1}{180}X1 + \frac{4}{9} \quad (1)$$

where $10 \leq X1$, and $$X2 \leq \frac{1}{10}X1 \quad (2)$$

[8] The production method according to any one of 1 to 7 described above, wherein the flow rate X1 of the buffer is about 10 to about 1500 mL/min.

[9] The production method according to any one of 1 to 8 described above, wherein the inner diameter Y of the micromixer is about 0.1 to about 1.0 mm.

[10] The production method according to any one of 1 to 9 described above, wherein the solubilized solution contains any one of urea, guanidine hydrochloride, and a combination of trifluoroacetic acid and acetonitrile.

[11] The production method according to any one of 1 to 10 described above, wherein in the refolding method, a flow path is filled with a solution not containing a protein but containing a denaturant before the solubilized solution is circulated.

[12] The production method according to any one of 1 to 11 described above, wherein the refolded protein is a monomer.

[13] The production method according to any one of 1 to 12 described above, further comprising a purification step after the refolding step.

The present inventors also have earnestly studied a protein refolding apparatus, and have found as a result that, by use of a flow microreactor equipped with a micromixer having an inner diameter of about 0.1 to about 1.0 mm, when a buffer and a solubilized solution of denatured protein are continuously mixed in a micromixer, it is possible to suppress the formation of aggregates and obtain a properly refolded protein. Thus, the present invention has been completed. Specifically, the present invention provides the following apparatus.

[14] A protein refolding apparatus, including:
a first flow path through which a buffer circulates;
a second flow path through which a solubilized solution of a protein which has become insoluble or lost a higher-order structure thereof circulates; and
a micromixer having an inner diameter of about 0.1 to about 1.0 mm in which the first flow path and the second flow path are combined and mixed.

[15] The apparatus according to 14 described above, further including: a syringe pump, a plunger pump, or a diaphragm pump for feeding a buffer and a solubilized solution of protein.

Advantageous Effects of Invention

Since the present invention makes it possible to accurately control the refolding conditions (particularly, the flow rates of the buffer and the solubilized solution of denatured protein, and the mixing time), a protein that has been refolded and restored its activity can be obtained in a high yield. According to the apparatus of the present invention, when the production amount is increased, the same system is only increased, so that upscaling can be easily performed without receiving a scale gap.

BRIEF DESCRIPTION OF DRAWINGS

FIG. 1 is a diagram in which a description of each state is added to FIG. 4 (schematic diagram showing the progress of refolding) of K. Tsumoto et al., Protein Expression and Purification 28 (2003) 1-8.

FIG. 2A is a cross-sectional view of a T-shaped micromixer.

FIG. 5 is a graph showing the relationship between the flow rate and the rfIL-6 monomer yield at various flow path inner diameters measured in Example 1.

FIG. 6A shows the peaks of rhIL-6 (Monomer) refolded according to the present invention and aggregates (Dimer) of rhIL-6 measured in Example 2.

DESCRIPTION OF EMBODIMENTS

Figure 2B:
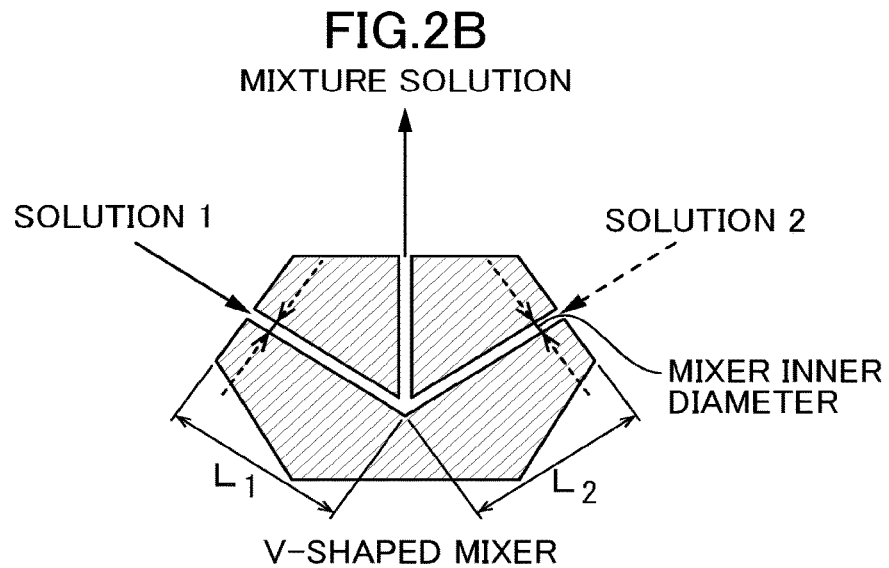
FIG. 2B is a cross-sectional view of a V-shaped micromixer.

1. The Method of the Present Invention

A microreactor is generally a reactor that reacts in a space of tens to hundreds of microns. The microreactor used in the method of the present invention is a continuous flow type.

On the other hand, when a protein which has become insoluble or lost a higher-order structure thereof is solubilized with a denaturant, and then the denaturant is removed to the extent that the solubilized protein restores its three-dimensional structure, the protein is refolded.

In the method of the present invention, by use of a micromixer provided in an FMR, a solubilized solution of a protein which has become insoluble or lost a higher-order structure thereof is continuously and rapidly mixed with a buffer for high-speed mixing and dilution, and it is possible to remove the denaturant from around the solubilized protein and refold the protein.

The method of the present invention makes it possible to achieve high-speed mixing in which a mixing time obtained by the following formula (I) is less than about 3 msec.

$$tm = 0.15\varepsilon^{-0.45} \quad (I),$$

where $\varepsilon$ is an energy dissipation rate, Q is a flow rate, $\Delta P$ is a pressure loss, $\rho$ is a density, V is a mixer volume, and $\varepsilon = Q\Delta P/\rho V$.

The faster the mixing time, the more the formation of aggregates can be suppressed, and it is possible to obtain a high yield of the refolded protein as the target product. The mixing time is preferably shorter than about 3 msec, more preferably about 1.4 to about 0.001 msec, further preferably about 1 to about 0.001 msec, and further preferably about 0.87 to about 0.001 msec.

[Protein]

The protein as the refolding target according to the present invention is a protein that has been insolubilized or has lost its higher-order structure and has lost its function or activity. In the present specification, such a protein may be referred to as a denatured protein. Insolubilized proteins and proteins that have lost their higher-order structure cannot be clearly distinguished, but their higher-order structures are different from those in their native state.

The insolubilized proteins are, for example, genetically modified proteins prepared by using microorganisms such as *Escherichia coli* as a production host. The proteins thus obtained usually have a solubility in 100 g of water of about 0.001 g or less (25° C.), and thus can be used in the present invention. They may be a protein that has been insolubilized from the soluble state by receiving some stress.

The form of the protein is not particularly limited, and may be, for example, granular, powdery, fibrous, or aggregate. There are also soluble proteins, such as aggregates, whose higher-order structure differs from that of the native state, without the help of denaturants. Such proteins are also subject to refolding according to the present invention.

The present invention can be applied to a protein whose secondary structure is mainly composed of an α-helix (such as IL-6), a protein composed of a β-sheet (such as scFv or Fab), or a protein composed of both (such as transglutaminase). It can also be applied to proteins with complex structures and is not limited by the characteristics of the primary or secondary structure of the protein.

The present invention can also be applied to both monomeric proteins (such as IL-6) and multimeric proteins (such as Fab). However, since the optimum states for refolding of the polymeric and monomeric proteins are different, a higher monomer yield is obtained when the monomeric protein is adjusted to the optimum conditions than when the polymeric protein is adjusted to the optimum conditions. Protein fragments can also be used. For example, it can be used in the present invention in terms of weight average molecular weight (measured by ultracentrifugation analysis or static light scattering analysis under room temperature conditions) from about 5000 daltons to about 150000 daltons.

A protein having no intramolecular or intermolecular disulfide bond (such as transglutaminase) or a protein having such a bond (such as IL-6, scFv, or Fab) can also be applied.

Specific examples include cytokines such as human interleukin-6 and IGF; proteinaceous ligands that exert their functions by acquiring specific higher-order structures such as growth factors, various hormones (such as activin A and TGF-β), and differentiation-inducing factors; enzymes such as transglutaminase and lysozyme; proteinaceous enzyme inhibitors; and antibody-related molecules having an immunoglobulin structure.

The antibody-related molecules include antibody fragments such as antibody variable region (Fv, fragment of variable region), single chain antibody variable region (scFv, single chain Fv), antigen binding site (Fab, fragment of antigen binding), antigen binding site (Fab'), and divalent antigen binding site (F(ab') 2); bispecific single chain antibody variable region (bispecific single chain Fv) or diabody, and artificial antibody such as artificial small antibody (minibody) that is dimerized by fusing the antibody variable region and a part of the antibody Fc domain; single-domain antibody composed of a single domain derived from a light chain or a heavy chain among the domains constituting the antigen binding site or antibody variable region, and Fc fusion protein, which is a fusion of a protein or peptide into the antibody Fc domain.

More specific examples include one in which single chain antibody variable region (scFv) such as HyHEL-10 scFv, for example pexelizumab (scFv), antigen-binding site (Fab) such as abciximab (trade name ReoPro), ranibizumab (trade name LUCENTIS), or certolizumab (trade name Cimzia), Fc fusion protein such as anti-Fluorescein scFv Fc fusion, for example romiplostim (trade name Nplate), rilonacept (trade name ARCALYST), abatacept (trade name ORENCIA) or alefacept (trade name AMEVIVE), or the like is insolubilized or has lost the higher-order structure. The structures of these antibody-related molecules are described in detail in publicly known papers such as Holliger P. and Hudson P J. Nature Biotechnology 23 (9), 1126-1136 (2005).

Artificial affinity molecules other than the immunoglobulin structure made of, for example, ankyrin repeat, fibronectin type III domain, lipocalin, and the like as a scaffold structure can also be used in the present invention.

In the present invention, the a protein which has become insoluble or lost a higher-order structure thereof is contained in a solution containing a denaturant, solubilized, and then circulated to a micromixer. The concentration of protein in the solubilized liquid is preferably about 0.1 to about 20 mg/mL, more preferably about 0.25 to about 5 mg/mL, and further preferably about 0.5 to about 3.5 mg/mL. As a result, the solubilized solution can be circulated in a micromixer having a predetermined inner diameter and mixed quickly and sufficiently with the buffer.

[Denaturant]

Denaturants are commonly used to cause proteins to lose their higher-order structures and inactivate them, and in refolding play a role in stretching a protein which has become insoluble or lost a higher-order structure thereof, loosening the structures thereof, or untangling them to solubilize the proteins.

In the present invention, as the denaturant that can be used for solubilizing denaturing proteins, those known in the art can be used without particular limitation. For example, it is possible to use urea, guanidine hydrochloride, acids such as trifluoroacetic acid (TFA), solvents such as acetonitrile, and surfactants. The surfactants include dicarboxylic acids having an acyl group of $C_8$ to $C_{16}$, decanoyl sarcosine (lauroyl sarcosine, lauroyl-Sar), decanoyl alanine (lauroyl alanine, lauroyl-Ala), decanoic acid or salts thereof (such as sodium salts and potassium salts), lauryl trimethyl ammonium chloride (LTAC), and mixtures thereof. Among these, the dicarboxylic acids having an acyl group of $C_8$ to $C_{16}$, decanoyl sarcosine, decanoyl alanine, or salts thereof are preferable. The dicarboxylic acids having an acyl group of $C_8$ to $C_{16}$ or salts thereof are more preferable. It is further preferable that the dicarboxylic acids having an acyl group of $C_8$ to $C_{16}$ be lauroyl glutamic acid (lauroyl-Glu), lauroyl aspartic acid (lauroyl-Asp), or lauroyl iminodiacetic acid. Lauroyl-Glu, lauroyl-Asp, lauroyl-Sar, and lauroyl-Ala may be any of D-form, L-form, DL-form. As the surfactant, lauroyl-L-Glu or a salt thereof is particularly and preferable because they have excellent solubilizing power for all insoluble proteins, can be easily removed without continuing to bind to the protein when diluted, and in addition, high-purity lauroyl-L-Glu reagents are available at low cost. As the denaturant used in the present invention, urea, guanidine hydrochloride, or a combination of TFA and acetonitrile is preferable because they have an excellent denaturing effect.

The concentration of the denaturant may be any concentration at which the denatured protein can be sufficiently stretched in the solution, and if the concentration of the denatured protein is as described above, it is preferably about 4 M or more. Thereby, the solubilization efficiency can be sufficiently increased. Since the denaturing effect is excellent, it is more preferably about 5 M or more, and further preferably about 6 M or more. The upper limit is preferably set within a range in which the dilution ratio is appropriately maintained, and is preferably about 10 M. At about 6 to about 8 M, the solubilization efficiency and dilution ratio can be optimized.

The solvent of the solubilized solution depends on the type of the denaturant used, but is preferably water. When a solvent such as acetonitrile is used as the denaturant, an additional solvent may or may not be used. A reducing agent such as dithiothreitol (DTT) or 2-mercaptoethanol may be added to the solubilized solution.

The pH of the solubilized solution at 25° C. can be selected from mild conditions of about pH 2.0 to about 9.0, preferably about pH 7.0 to about 8.5, depending on the properties of the denatured protein. Note that in the present invention, the pH can be measured by a pH meter equipped with a pH electrode. The pH adjustment can be performed using a base such as sodium hydroxide. A buffer solution may be used as the aqueous solution.

The temperature of the solubilized solution may be appropriately determined in consideration of the thermal properties of the protein to which the method of the present invention is applied, but is preferably about 4 to 40° C. Such a range is preferable because modifications such as cleavage and oxidation due to chemical reaction are suppressed to minimum. The temperature of the solubilized solution can be adjusted by equipping the reservoir tank with a warmer, externally attaching a pre-temperature control coil to the flow path, or immersing a micromixer or the like in a water bath.

Whether or not the protein is solubilized can be confirmed by, for example, visual turbidity determination or ultraviolet absorption spectral method at 280 nm.

[Buffer]

As the buffer that can be used in the present invention, ones known in the art can be used, such as tris buffer solution (such as tris hydrochloride and tris acetate), phosphate buffer solution (PBS), sodium acetate buffer solution, and sodium citrate buffer solution.

The buffer may contain amino acids such as arginine, cysteine, and cystine, and additives such as oxidized glutathione and reduced glutathione. The amino acids may form salts with inorganic acids such as hydrochlorides or with organic acids such as acetates. The amino acids may be a derivative of acylated arginine, such as N-butyroyl arginine. The additive concentration is selected according to the nature of the protein. The concentration of arginine contained is, for example, about 0.1 to about 1.5 M, preferably about 0.2 to about 1.2 M, the concentration of cysteine contained is, for example, about 1 to about 10 mM, preferably about 3 to about 6 mM, the concentration of cystine contained is, for example, about 0.1 to about 1 mM, preferably about 0.6 to about 1 mM, the concentration of reduced glutathione contained is, for example, about 1 to about 10 mM, preferably about 3 to about 6 mM, and the concentration of oxidized glutathione contained is, for example, about 0.1 to about 1 mM, preferably about 0.6 to about 1 mM, because the restoration of higher-order structure in the native state is promoted.

The pH of the buffer at 25° C. may be a pH suitable for the properties of the protein after combining with the solubilized solution, and is generally a pH within the pH range of about 4.0 to about 9.0. It may be the same as or different from the pH of the solubilized solution. The pH adjustment can be performed with, for example, hydrochloric acid, sodium hydroxide, or the like.

The temperature of the buffer may be the same as or different from the temperature of the solubilized solution, but is preferably the same. When the temperature of the buffer is the same as the temperature of the solubilized solution, the control of the refolding temperature is excellent. If the thermal stability when the target protein restores its activity is not sufficiently high, about 4 to about 10° C. is preferable. The temperature of the buffer can be adjusted by equipping the reservoir tank with a warmer, externally attaching a pre-temperature control coil to the flow path, or immersing a micromixer or the like in a water bath.

The buffer prepared as described above and the solubilized solution of denatured protein are supplied from different flow paths. The buffer and the solubilized solution of denatured protein can be circulated by a liquid feed pump. The flow rate of each solution can be adjusted by the pressure of the liquid feed pump.

The total of the flow rate of the buffer and the flow rate of the solubilized solution of denatured protein (hereinafter referred to as "total flow rate" or TFR) is preferably 5 mL/min or more because the collection rate of the protein that has restored its activity is excellent. The TFR is preferably about 1650 mL/min or less because the choice of pumps that can be used is expanded, and more preferably about 600 ml/min or less. The TFR is more preferably about 11 to about 600 mL/min, more preferably about 11 to about 330 mL/min, and further preferably about 20 to about 330 mL/min.

The number of flow paths through which each solution is circulated may be one or two or more. In order to mix both solutions in a micromixer, it is preferable to adjust the volume of both solutions so that the dilution ratio is several to several tens of times, for example, about 10 to 20 times.

The flow path may be filled with a solution not containing a denatured protein but containing a denaturant before the solubilized solution is circulated. As a result, the yield of the target protein is improved, and continuous liquid feeding can be stably performed.

Both solutions that have reached the micromixer are mixed in the micromixer. The micromixer used in the present invention is a mixer having a small flow path inner diameter (hence, sometimes referred to as a fine flow path) and does not have a stirring blade or an obstacle plate.

The inner diameter Y mm of the fine flow path constituting the micromixer can be determined in relation to the buffer flow rate X1 mL/min. Specifically, the relationship between X1 and Y can be shown by the following formula (1).

$$Y \leq \frac{1}{180}X1 + \frac{4}{9} \quad (1)$$

To achieve a satisfactory level of refolding rate, for example, about $10 \leq X1$. Since the flow rate depends on the mixing time, about $10 \leq X1 \leq 1500$ is preferable, about $10 \leq X1 \leq 300$ is more preferable, and about $20 \leq X1 \leq 300$ is further preferable.

If the inner diameter Y of the fine flow path of the micromixer is less than 0.1 mm, the pressure loss becomes large and thus it is difficult to use. Therefore, about $0.1 \leq Y$ is preferable, about $0.1 \leq Y \leq 1.0$ is more preferable, about $0.1 \leq Y \leq 0.5$ is further preferable, and about $0.25 \leq Y \leq 0.5$ is particularly preferable.

It is more preferably about $10 \leq X1 \leq 1500$ and about $0.1 \leq Y \leq 1.0$, further preferably about $0.1 \leq Y \leq 0.5$, and particularly preferably about $0.25 \leq Y \leq 0.5$. It is preferable that X1 and Y are in such ranges because the pressure loss and the mixing time can be controlled.

It is more preferably about $10 \leq X1 \leq 545$ and about $0.1 \leq Y \leq 1.0$, further preferably about $0.1 \leq Y \leq 0.5$, and particularly preferably about $0.25 \leq Y \leq 0.5$. It is preferable that X1 and Y are in such ranges because the pressure loss and the mixing time can be controlled.

It is particularly preferably about $10 \leq X1 \leq 300$ and about $0.1 \leq Y \leq 0.5$, and especially preferably about $0.25 \leq Y \leq 0.5$. It is preferable that X1 and Y are in such ranges because the mixing time and the pressure loss can be controlled.

It is most preferably about $20 \leq X1 \leq 300$ and about $0.25 \leq Y \leq 0.5$. It is preferable that X1 and Y are in such ranges because stable mixing performance can be obtained.

The flow rate of the solubilized solution can be determined in relation to the flow rate of the buffer. Specifically, the relationship between X1 and X2 can be shown by the following formula (2).

$$X2 \leq \frac{1}{10}X1 \quad (2)$$

It is preferable that X2 is about 1/10 or less of X1 because refolding can be caused by removing the denaturant or reducing the concentration of the denaturant as much as possible. X2 is more preferably about 1/50 or more of X1, further preferably about 1/30 or more, particularly preferably about 1/20 or more, and further preferably about 1/10 or less. The timings of starting the feeding of the buffer and the solubilized solution may be simultaneous or different, but if they are different, the solubilized solution is fed first.

The shape of the cross section of the fine flow path of the micromixer is not particularly limited, and a V-shape, a T-shape, or the like can be used. A V-shape is preferable because higher mixing performance can be expected.

It is more preferable that the shape of the cross section of the fine flow path of the micromixer is V-shaped, about $10 \leq X1 \leq 1500$, and about $0.1 \leq Y \leq 1.0$, more preferably about $0.1 \leq Y \leq 0.5$, and particularly preferably about $0.25 \leq Y \leq 0.5$, because higher mixing performance can be obtained.

It is more preferable that the shape of the cross section of the fine flow path of the micromixer is V-shaped, about $10 \leq X1 \leq 545$, and about $0.1 \leq Y \leq 1.0$, more preferably about $0.1 \leq Y \leq 0.5$, and particularly preferably about $0.25 \leq Y \leq 0.5$, because higher mixing performance can be obtained.

It is particularly preferable that the shape of the cross section of the fine flow path of the micromixer is V-shaped, about $10 \leq X1 \leq 300$, and about $0.1 \leq Y \leq 0.5$, and especially preferably about $0.25 \leq Y \leq 0.5$, because higher mixing performance can be obtained.

It is most preferable that the shape of the cross section of the fine flow path of the micromixer is V-shaped, about $20 \leq X1 \leq 300$, and about $0.25 \leq Y \leq 0.5$, because higher mixing performance can be obtained.

The pressure loss before and after the micromixer is preferably about 1 kPa to 10 MPa. By setting the pressure loss within this range, the mixing efficiency by the micromixer becomes high, and the upscaling in the production process can be easily carried out. The pressure loss can be controlled mainly by setting the specific gravity, flow rate, and pressure of the buffer and the solubilized solution.

In the present invention, mixing for at most 1 millisecond improves the refolding yield. The mixing time may vary depending on the flow rate and density of both solutions, the volume of the micromixer, and the like, and may be, for example, about 10 microseconds to 1000 microseconds, and particularly about 10 microseconds to 500 microseconds. Mixing in such a short time is also a rapid dilution of the solubilized solution of denatured protein and a rapid removal of the denaturant. Since the uniform solvent phase is obtained by rapid dilution, the structure of the intermediate is also homogeneous. On the other hand, if the dilution is slow, the solvent phase after dilution becomes non-uniform, and in addition to the intermediate, there are proteins that remain stretched by the denaturant, and the structures of the obtained protein are also various. When an intermediate gets stuck in a protein that remains stretched, it ends structure formation in an associative state. Without being bound by any theory, as mentioned above, the present inventors consider that high-speed mixing contributes to the suppression of aggregate formation.

The mixing time can be estimated by the following method, which is quantified with the pressure loss.

(Calculation Method)

In the report of Falk et al. (Chemical Engineering and Processing 50 (2011) 979-990), it is shown that the mixing time tm correlates with the energy dissipation rate ε, and it is shown that the mixing time can be shown by the following formula $$tm = 0.15\varepsilon^{-0.45} \quad (I)$$

(ε=QΔP/ρV, Q: flow rate, ΔP: pressure loss, ρ: density, V: mixer volume).

The temperature after mixing both solutions is preferably 4 to 40° C. as in the case of the solubilized solution of denatured protein, and may be 4 to 10° C. if the thermal stability when the target protein restores its activity is not sufficiently high. Within such a range, modifications such as cleavage and oxidation due to chemical reaction can be suppressed to minimum. The temperature after mixing of both solutions can be adjusted by a constant temperature bath such as a water bath provided in the micromixer.

By being diluted in a micromixer, the denatured protein restores its higher-order structure and restores activity. The protein that has restored activity is sent to the retention tube together with the solubilized solution and buffer in which it was originally contained. The flow rate at this time is not particularly limited, but is preferably about 10 to 1500 mL/min in order to obtain sufficient mixing performance. After draining the mixture from the micromixer, the flow path may be replaced with a buffer. As a result, protein aggregation in the flow path can be suppressed.

The solution sent from the micromixer to the retention tube may contain an intermediate that has not been refolded (that is, I in FIG. 1), and when the solution is retained in the retention tube, the denatured protein restores its higher-order structure and restores activity. That is, the refolding rate is improved after passing through the retention tube than immediately after passing through the micromixer. The solution in the retention tube may be left or allowed to stand, circulated, or stirred. The retention time is several hours to several days, for example about 2 hours to 24 hours. The retention temperature is preferably about 4 to 40° C. As described later, a container such as a beaker may be used instead of the retention tube.

After passing through the retention tube, the solution containing the refolded protein is removed from the outlet, and if necessary, placed in a receiver container.

The protein placed in the receiver container may be purified by conventional methods such as ultrafiltration, dialysis, ion exchange chromatography, gel filtration chromatography, hydrophobic mutual chromatography, reverse phase chromatography, and affinity chromatography.

The target protein can be collected by fractionation by the above chromatography.

Whether or not the protein has restored its native state higher-order structure can be confirmed by spectroscopic measurement such as CD spectrum or fluorescence spectrum, the method of observing physicochemical properties of protein such as HPLC, or higher-order structural index such as enzyme activity.

2. The Apparatus of the Present Invention

As described above, the method of the present invention can be carried out continuously using a microreactor equipped with a micromixer. Therefore, the present invention further provides a protein refolding apparatus that can use the method of the present invention. The apparatus of the present invention is described below.

A microreactor is generally a reactor that reacts in a space of tens to hundreds of microns, and can achieve high-speed mixing. The apparatus of the present invention includes a first flow path through which a buffer is circulated, a second flow path through which a solubilized solution of an a protein which has become insoluble or lost a higher-order structure thereof is circulated, and a micromixer in which the buffer and the solubilized solution merge. The first flow path and the second flow path are in communication with the micromixer. The apparatus of the present invention is also a continuous flow type.

As the micromixer used in the present invention, general ones can be used, such as a slit type, a disc type, and a forced contact type. The slit type micromixer is a mixer in which a rectangular partition wall having waves parallel to the short side is bent parallel to the short side in a folding screen shape at equal intervals to form multiple fine flow paths. The disc type micromixer is a mixer in which thin foils are stacked to form a fine flow path. The forced contact type micromixer is a mixer with a nozzle. Since any of the micromixers can simultaneously contact (that is, combine) and mix the buffer with the solubilized solution, it is unnecessary to further mix the mixture liquid that has passed through the micromixer using another mixer such as a static mixer. That is, according to the present invention, combining and mixing of both solutions can be performed in one step. The forced contact type is preferable because it minimizes blockage troubles due to the flow path and provides excellent mixing performance.

To explain with reference to FIG. 2, the forced contact type micromixer forcibly generates convection in the microspace and increases the contact area of the fluid to promote molecular diffusion, thereby performing rapid mixing. Of these, the simplest type of micromixer that causes fluids to collide is the T-shaped micromixer shown in FIG. 2A and the V-shaped micromixer shown in FIG. 2B. In both cases, the forced contact type micromixer communicates with the first flow path and the second flow path, and the buffer ("Solution 1" in the figure) and the solubilized solution of denatured protein ("Solution 2" in the figure) flow in from the flow paths. When the respective fluids collide, convection is generated by the kinetic energy of the fluids to promote mixing, and the mixture solution is discharged from the third flow path. Since the diffusion time of the liquid in the micromixer is proportional to the kinetic energy of the fluid and the width of the flow path, when the flow rate is about 5 mL/min or more and the inner diameter Y is about 0.1 to 1.0 mm, high-speed mixing and precision mixing can be performed efficiently, so that such a micromixer with an inner diameter Y is more preferable. It is further preferable that the flow rate is about 11 mL/min or more and the inner diameter Y is about 0.1 to 0.5 mm. It is particularly preferable that the flow rate is about 22 mL/min or more and the inner diameter Y is about 0.25 to 0.5 mm. The length of the fine flow path through which each of the solution 1 and the solution 2 passes (indicated by "L1" and "L2" in FIGS. 2A and 2B) is preferably about 10 to about 20000 μm, and further preferably about 100 to about 5000 μm, and about 200 to about 3000 μm is preferable because sufficient mixing performance can be obtained. Note that L1 and L2 may be the same or different from each other, but are preferably the same. The material of the material constituting the micromixer may be metal, glass, or silicon.

As the micromixer, for example, ones commercially available from Fraunhofer IMM, YMC, and Sankoh Seiki Kogyo can be used.

In a micromixer, the buffer and the solubilized solution of denatured protein are mixed at the same time as they come into contact to produce a refolded protein or an intermediate thereof. The buffer and solubilized solution of denatured protein that can be used here are as described above. Each flow path of the buffer and the solubilized solution can be directly connected to the micromixer to allow the buffer and the solubilized solution to combine and mix in the micromixer.

Without being bound by any theory, the present inventors speculate that even though the refolding is not completed in the micromixer, the intermediate obtained in the micromixer according to the present invention has the structure required for correct refolding, and thus the active structure can then be restored without any additional operation (that is, as described in FIG. 1, the reaction proceeds from I to N).

The apparatus of the present invention may include a reservoir tank for storing each solution before circulation. The reservoir tank may have temperature-raising and temperature-retaining functions.

The first flow path and the second flow path form a closed space except that both ends are open. The inner diameters of the first flow path and the second flow path may be, for example, about 2 mm. As the material of the flow paths, for example, an inorganic material such as SUS or an organic material such as polytetrafluoroethylene (PTFE) can be used. The length of the first flow path and the second flow path is, for example, about 0.1 to about 5.0 m. Thereby, the temperature can be controlled.

The micromixer may be connected to a third flow path through which both liquids combined by the micromixer circulate. The inner diameter and material of the third flow path are the same as described for the first and second flow paths. The length of the third flow path is, for example, about 0.1 to about 5.0 m. Thereby, the temperature of the mixed solution can be controlled.

The circulation of the buffer and the solubilized solution of denatured protein can be performed by the liquid feed pump provided in the first flow path and the second flow path. As the liquid feed pump, a syringe pump, a plunger pump, a diaphragm pump, or the like can be used. The pressure of the liquid feed pump is set so that the flow rate of each solution is in the range described above.

In order to increase the mixing efficiency in the micromixer, it is preferable to pressurize the buffer with a pump for buffer and pressurize the solubilized solution with a pump for solubilized solution, and then supply the pressurized buffer and the pressurized solubilized solution to the micromixer. Preferably, the buffer supply pipe and the solubilized solution supply pipe upstream of the micromixer are each provided with a back pressure valve in order to prevent one raw material from flowing into the supply pipe of the other raw material and to prevent the backflow of the mixture liquid. The position of the back pressure valve is preferably a position as close to the combination point as possible.

In the micromixer, the buffer and the solubilized solution are mixed to perform protein refolding, and the flow rates of both solutions flowing into the micromixer and the inner diameter of the micromixer are set as described above so that correct refolding can be performed in a short time.

The mixture liquid leaving the micromixer is fed to the receiver tank. The proteins in the receiver tank have been refolded, and thus can be used as is or stored in the tank until used.

A retention tube may be provided between the micromixer and the receiver tank. According to the present invention, mixing in a micromixer produces the intermediates required for proper refolding, and it is presumed that this intermediate is then automatically refolded into an active protein if left alone. Therefore, it is not essential to retain the mixture liquid in the retention tube, but it is better to allow a certain amount of time after mixing in order to surely complete the refolding and increase the refolding rate. That is, the retention tube serves as a place for leaving the mixture liquid. Therefore, it is possible for the retention can to have a long flow path so that the mixture liquid can pass through for a long time. The shape may be, for example, a coil shape. The retention tube also serves to receive the mixture liquid vigorously discharged from the micromixer without leakage. Therefore, any container such as a beaker can be used instead of the retention tube. The mixture liquid may be allowed to stand in the container or may be stirred.

The apparatus of the present invention may be provided with a coil for adjusting the temperature of the solubilized solution of denatured protein and/or the buffer in the first flow path and/or the second flow path. As the temperature control member, a water bath can also be used. The temperature can be adjusted by immersing a container such as a micromixer, a first flow path and/or a second flow path connected to the micromixer, a third flow path provided as necessary, and a retention tube in a water bath.

The lengths of the first flow path and the second flow path are determined so that the temperature of the solubilized solution is suitable for refolding the proteins contained in the solution just before the two solutions are mixed.

The apparatus of the present invention may further include a coil for pre-temperature control and a temperature control element such as a water bath. When the coil is installed between the first flow path and the second flow path and the micromixer M1, the temperature of both solutions can be adjusted to a desired temperature by the time both solutions reach the micromixer. The coil can be installed in only one of the first flow path and the second flow path, but is preferably installed in both because the mixing efficiency does not decrease when the temperatures of both solutions are the same when mixing in the micromixer. When the micromixer is placed in the water bath, the temperature of the solution can be adjusted before and after mixing. The water bath may include a first flow path, a second flow path, and a third flow path connected to the micromixer, and may further include a pre-temperature control coil and a retention tube installed as needed.

Specific examples of the refolding apparatus of the present invention are described with reference to FIGS. 3 and 4.

Figure 3:
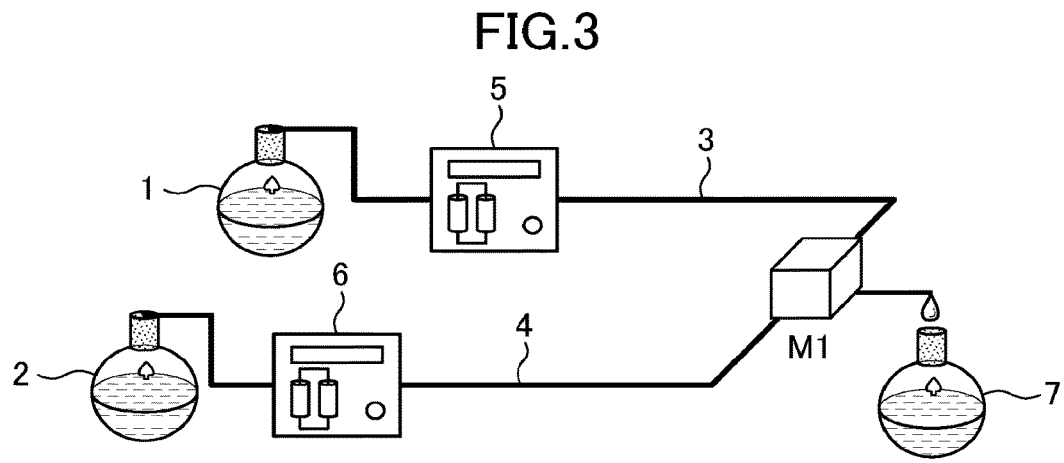
FIG. 3 is a schematic diagram of the FMR apparatus used in the Examples.

In FIG. 3, a first flow path 3 for circulating the buffer is provided immediately downstream of the reservoir tank 1 for storing the buffer, a second flow path 4 for circulating the solubilized protein is provided immediately downstream of the reservoir tank 2 for storing the solubilized solution of denatured protein, and the first flow path 3 and the second flow path 4 are directly connected to the micromixer M1. The micromixer M1 is further connected to a receiver tank 7 for receiving the mixture liquid via a third flow path for circulating the mixture liquid. The first flow path 3 and the second flow path 4 include liquid feeding pumps 5 and 6 for buffer and solubilized protein solution, respectively, so that the flow rate of the buffer and the solubilized solution when flowing into the micromixer is within the above range.

Figure 4:
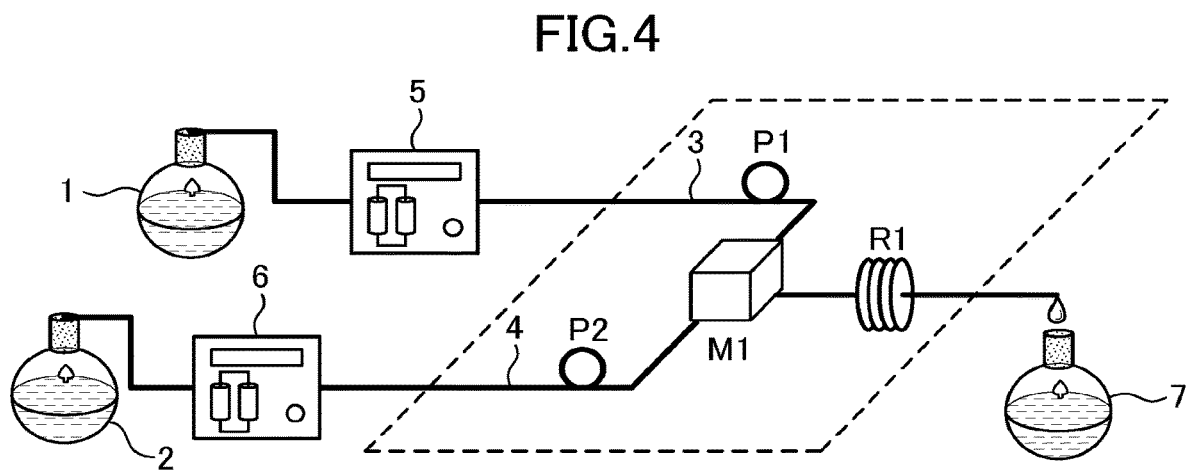
FIG. 4 is a schematic diagram of the FMR apparatus used in the Examples.

FIG. 4 shows a microreactor apparatus of FIG. 3 to which coils P1 and P2 for pre-temperature control, a retention tube R1, and a water bath (indicated by dotted lines in the figure) are further added. The coils P1 and P2 are provided between the liquid feeding pumps 5 and 6 and the micromixer M1 so that both solutions are adjusted to a desired temperature by the time they reach the micromixer M1. The retention tube R1 is provided between the micromixer M1 and the receiver tank 7, and can temporarily receive the mixture liquid flowing out of the micromixer M1 and, if an intermediate is present, put the protein in an active native state to complete the refolding. The coils P1 and P2 for pre-temperature control, the micromixer M1, the retention tube R1, the first flow path, the second flow path, and the third flow path are installed in the water bath for temperature control, and the temperatures of both solutions can be adjusted before and after mixing.

The apparatus of the present invention can be used alone, but the production amount can be increased by connecting a plurality of apparatuses in series or in parallel. According to the present invention, the same system is only increased, so that upscaling can be easily performed without receiving a scale gap.

EXAMPLES

FMR Apparatus and Operation Outline

FIG. 3 shows a schematic diagram of the FMR apparatus. The FMR apparatus was constructed from reservoir tanks 1 and 2 (with temperature-retaining function) for storing the buffer and solubilized solution of denatured protein, a first flow path 3 for circulating the buffer, a second flow path 4 for circulating the solubilized protein, liquid feeding syringe pumps 5 and 6 for buffer and solubilized protein, a micromixer M1, and a receiver tank 7 for receiving a mixture liquid. The micromixer M1 is the T-shaped micromixer shown in FIG. 2A or the V-shaped micromixer shown in FIG. 2B. The flow paths of the first flow path 3 and the second flow path 4 are 1.0 m. As shown in FIG. 4, the pre-temperature control coils P1 and P2, the retention tube R1, and the temperature control water bath (indicated by the dotted lines in the figure) can be used as needed. Table 1 shows the inner diameters and shapes of the flow paths in the micromixer M1. Note that the flow path inner diameter refers to the width of the flow path of the mixing portion.

TABLE 1

| Type | Flow Path Inner Diameter Y | Flow Path Shape | L1 | L2 |
|---|---|---|---|---|
| 1 | 0.2 mm | V-shaped | 2.5 mm | 2.5 mm |
| 2 | 0.25 mm | V-shaped | 2.5 mm | 2.5 mm |
| 3 | 0.5 mm | V-shaped | 2.5 mm | 2.5 mm |
| 4 (For Comparison) | 1.0 mm | T-shaped | 2.5 mm | 2.5 mm |
| 5 | 1.0 mm | V-shaped | 2.5 mm | 2.5 mm |

In the following Examples, refolding was performed using the FMR apparatus constructed in this way. Specifically, the buffer and the solubilized protein stored in the reservoir tanks were fed by liquid feeding pumps and mixed in a micromixer. When changing the mixing temperature, the micromixer was immersed in a water bath. Unless otherwise specified, the mixing temperature was 25° C.

[Preparation for Solubilized Solution of Protein which has Become Insoluble or Lost a Higher-Order Structure Thereof]

As follows, a commercially available protein was denatured with a denaturant to prepare a solubilized solution of a protein which has become insoluble or lost a higher-order structure thereof.

Recombinant human IL-6 (rhIL-6) was denatured by being dissolved in 0.1% TFA and 40% acetonitrile solution (denatured rhIL-6 concentration 3.5 mg/mL, pH 2.0). This solution is hereinafter referred to as "denatured rhIL-6 solution A." · Recombinant human IL-6 (rhIL-6) was denatured by being dissolved in 8 M guanidine hydrochloride solution (pH 9.0) (denatured rhIL-6 concentration 3.5 mg/mL, pH 9.0). This solution is hereinafter referred to as "denatured rhIL-6 solution B."

Recombinant human IL-6 (rhIL-6) was denatured by being dissolved in 8 M urea solution (denatured rhIL-6 concentration 3.5 mg/mL, pH 9.0). This solution is hereinafter referred to as "denatured rhIL-6 solution C".

To a 2 mg/mL lysozyme solution, 8 M guanidine hydrochloride and 4 M DTT solution were added for denaturation (lysozyme concentration 0.5 mg/mL, pH 9.0). This solution is hereinafter referred to as "denatured lysozyme solution."

[Example 1] Refolding of rhIL-6 (1)

In Example 1, the effects of the buffer flow rate and the micromixer flow path shape on the yield of refolded rhIL-6 were examined.

The denatured rhIL-6 solution A prepared above was mixed with a buffer (50 mM sodium acetate, pH 4.3) using an FMR apparatus and diluted 20-fold (rhIL-6 concentration 0.175 mg/mL). In the obtained sample, the component peak was quantified by gel filtration chromatography (Superdex 75 10/300 GL (GE Healthcare)) capable of separating the target product and byproducts. The supernatant in an amount of 20 μL was subjected to gel filtration HPLC (column, Superdex 75 10/300 GL, manufactured by GE Healthcare; developing solution 0.1 M sodium phosphate, 0.2 M arginine hydrochloride, 1 M urea, pH 6.8; flow rate 0.8 mL/min; detection method, UV absorption at 225 nm and 280 nm; quantitative standard, purified rhIL-6) to quantify rhIL-6 having a monomer structure, a dimer, and an aggregate structure.

The buffer and the denatured rhIL-6 solutions were introduced into the above-constructed FMR apparatus (FIG. 3, the micromixer is type 1 or type 3) at various flow rates. The introduction of both solutions was started at the same time. The flow rate of each solution is as shown in Table 2.

TABLE 2

Rate of Solubilized

| Total Flow Rate | Flow Rate of Buffer (mL/min) | Flow Rate of Solubilized Solution of Denatured Protein (mL/min) |
|---|---|---|
| ◆ 10 mL/min (φ0.5 mm) | 9.5 mL/min | 0.5 mL/min |
| ■ 15 mL/min (φ0.5 mm) | 14.25 mL/min | 0.75 mL/min |
| ▲ 20 mL/min (φ0.5 mm) | 19.0 mL/min | 1.0 mL/min |
| ×30 mL/min (φ0.5 mm) | 28.5 mL/min | 1.5 mL/min |
| * 40 mL/min (φ0.5 mm) | 38.0 mL/min | 2.0 mL/min |
| ● 20 mL/min (φ0.2 mm) | 19.0 mL/min | 1.0 mL/min |

FIG. 5 shows the results. The horizontal axis of FIG. 5, "Total Flow Rate," indicates the sum of the flow rate of the buffer and the flow rate of the solubilized solution of denatured protein (the same applies to FIGS. 7, 9, 10, 11, and 12). Note that since refolding is performed correctly, rhIL-6 can be obtained as a monomer, and thus the yield of rhIL-6 is represented as the monomer yield in FIG. 5. From FIG. 5, it can be understood that increasing the flow rate also improves the yield. It can also be understood from FIG. 5 that the yield is improved even when the inner diameter of the flow path in the mixer is reduced from 0.5 mm to 0.2 mm. High-speed mixing by FMR can suppress the formation of aggregates and improve the yield.

[Example 2] Refolding of rhIL-6 (2)

In Example 2, refolding was performed using the FMR apparatus of the present invention, a batch method or gel filtration column, and the refolding rates were compared.

The solubilized solution of denatured protein and buffer were the same as those used in Example 1.

Refolding according to the present invention was carried out in the same manner as in Example 1 except that a type 3 micromixer was used, the flow rate of the buffer was set to 38 mL/min, and the flow rate of the denatured protein solution A was set to 2.0 mL/min.

In the batch method, the denatured rhIL-6 solution was added dropwise to a reactor in which a beaker filled with a dilution buffer had been stirred with a magnetic stirrer. The scale of the solution was 10 mL.

Buffer exchange using a gel filtration column was performed by the method described in BIOTECHNOLOGY AND BIOENGINEERING, VOL. 62, NO. 3, Feb. 5, 1999.

Figure 6B:
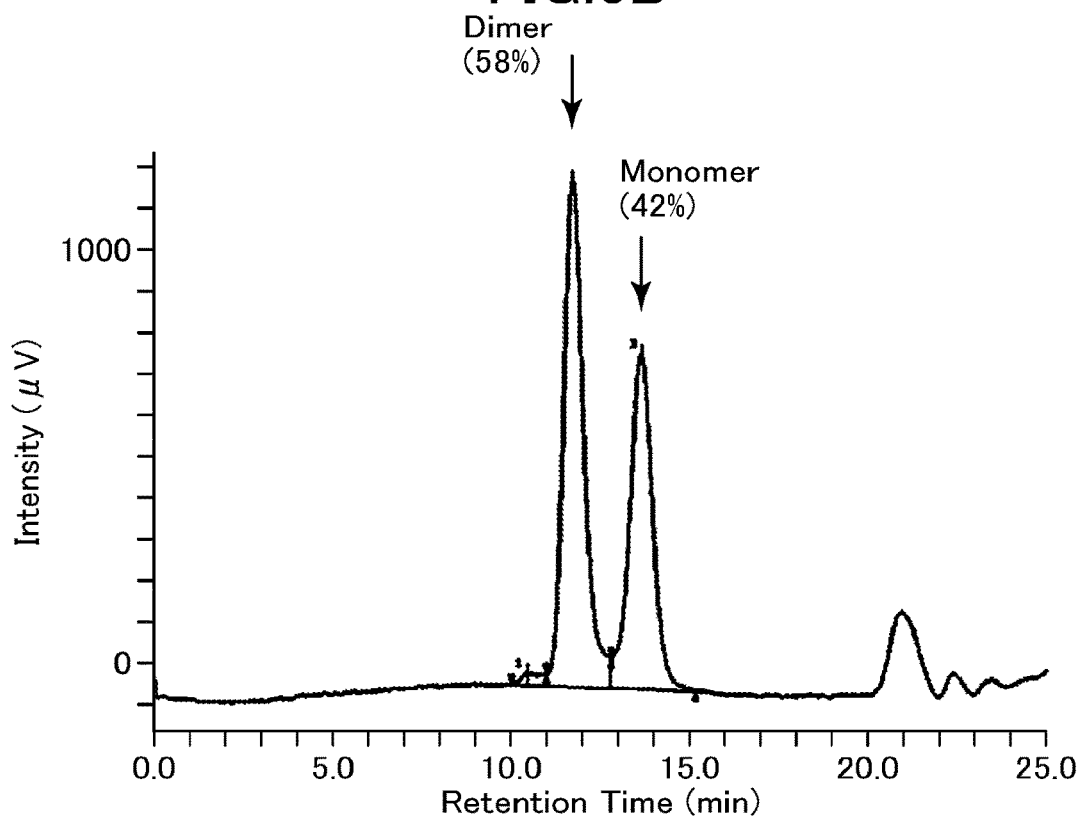
FIG. 6B shows the peaks of the refolded rhIL-6 (Monomer) and the rhIL-6 Dimer when mixed in a batch method measured in Example 2.
Figure 6C:
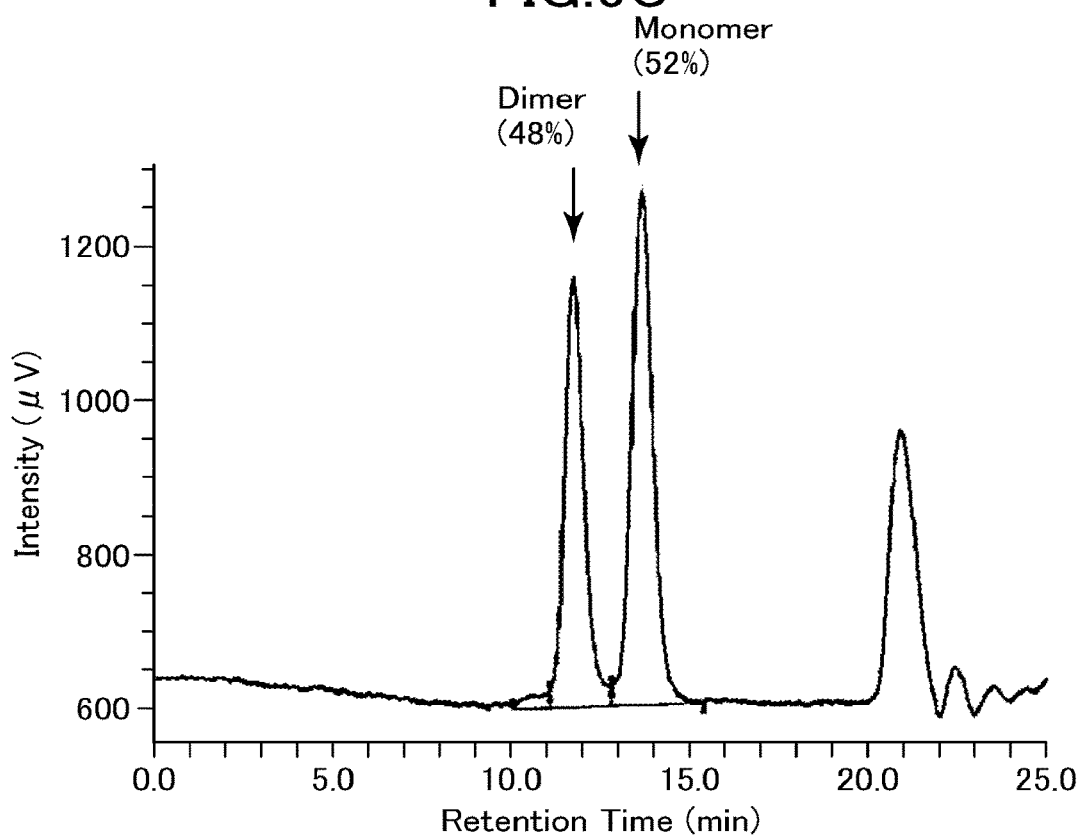
FIG. 6C shows the peaks of the refolded rhIL-6 (Monomer) and the rhIL-6 Dimer when mixed by buffer exchange with a gel filtration column measured in Example 2.

FIG. 6 shows the results. FIG. 6A shows the peaks of rhIL-6 (Monomer) refolded according to the present invention and aggregates (Dimer) of rhIL-6. FIG. 6B shows the peaks of the refolded rhIL-6 (Monomer) and the rhIL-6 Dimer when mixed in a batch method. FIG. 6C shows the peaks of the refolded rhIL-6 (Monomer) and the rhIL-6 Dimer when mixed by buffer exchange with a gel filtration column. Table 3 summarizes the results of FIG. 6.

TABLE 3

Comparison of Refolding Yields by Solvent-Acid Denaturation

| Condition | Monomer % | Dimer |
|---|---|---|
| FMR | 93 | 7 |
| Batch Refolding | 42 | 58 |
| Column Exchange | 52 | 48 |

[Example 3] Refolding of rhIL-6 (3)

In Example 3, the refolding rate when the protein was denatured with guanidine was compared between the present invention and the batch method.

Experiments were carried out in the same manner as in Example 2 except that the denatured rhIL-6 solution B was used as the solubilized solution of denatured protein and 50 mM sodium acetate (pH 5.0) was used as the buffer.

Table 4 shows the yields of refolded rhIL-6 (Monomer) and aggregates (Dimer) of rhIL-6 when the denatured rhIL-6 solution B and the buffer were mixed. From Table 4, it can be understood that the formation of aggregates can be suppressed and the yield can be improved by high-speed mixing by FMR as compared with the case of mixing by batch method.

TABLE 4

Comparison of Refolding Yields by Guanidine Denaturation

| Condition | Monomer (%) | Dimer |
|---|---|---|
| FMR | 91.2 | 8.8 |
| Batch Refolding | 77.1 | 22.9 |

[Example 4] Refolding of Lysozyme

In Example 4, the effects of the buffer flow rate and the micromixer flow path shape on the yield of refolded lysozyme were examined.

The denatured lysozyme solution prepared above was mixed with a buffer (6 mM Cys, 0.6 mM Cystine, 20 mM Tris acetate) and diluted 10-fold. The buffer and lysozyme solution were introduced to the FMR apparatus (FIG. 3) constructed above, where the micromixer was type 2 (V0.25), type 3 (V0.5), or type 4 (T1.0) at various flow rates. The flow rate of each solution is as shown in Table 5. The introduction of both solutions was started at the same time. The pre-temperature control coils P1 and P2 were adjusted so that the temperatures of both liquids were 4° C.

For comparison, the batch method was also used for mixture instead of the FMR apparatus. In the batch method, the denatured lysozyme solution was added dropwise to a reactor in which a beaker filled with a dilution buffer had been stirred with a magnetic stirrer. The scale of the solution was 10 mL.

Figure 7:
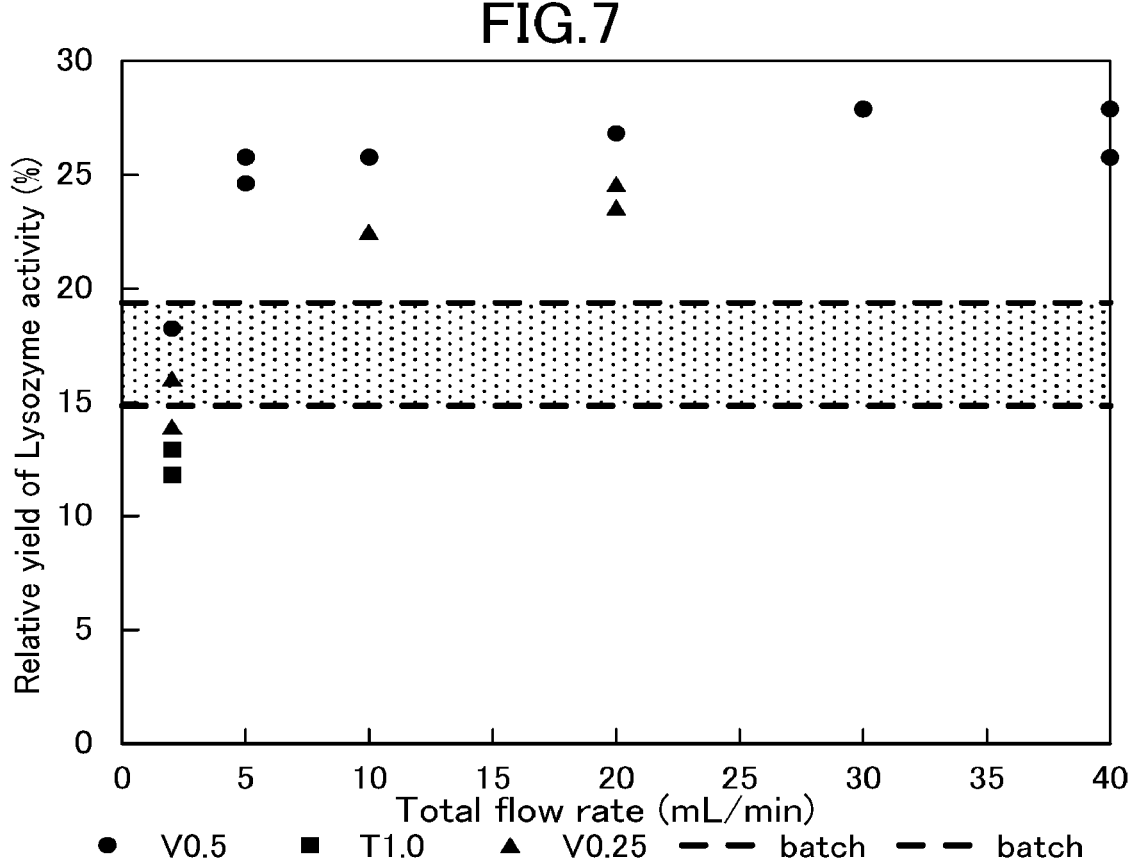
FIG. 7 shows the lysozyme enzyme activity at various flow rates measured in Example 4.

The mixed sample was allowed to stand for 2 hours, and the enzyme activity was measured with a lysozyme activity kit (LY0100-kit, sigma). FIG. 7 shows the results.

TABLE 5

| Total Flow Rate | Flow Rate of Buffer (mL/min) | Flow Rate of Solubilized Solution of Denatured Protein (mL/min) |
|---|---|---|
| 2 mL/min | 1.8 mL/min | 0.2 mL/min |
| 5 mL/min | 4.5 mL/min | 0.5 mL/min |
| 10 mL/min | 9.5 mL/min | 0.5 mL/min |
| 20 mL/min | 19.0 mL/min | 1.0 mL/min |
| 30 mL/min | 28.5 mL/min | 1.5 mL/min |
| 40 mL/min | 38.0 mL/min | 2.0 mL/min |

Example 5

In Example 5, the conditions for stable continuous liquid feeding were examined.

(Experimental Method)

The denatured rhIL-6 solution B prepared above was diluted (20-fold diluted) with 20 mM Tris HCl Buffer (pH 9.0), and the monomer/dimer ratio was calculated in the same manner as in Example 2. At this time, a comparison was made between the conditions under which the solution in the reactor was first filled with an 8 M guanidine hydrochloride solution and then the buffer was flowed, and the conditions under which water was filled and then the buffer was passed. The buffer and the denatured rhIL-6 solution B were introduced into the FMR apparatus constructed above (FIG. 3, the micromixer is type 3) at various flow rates. The introduction of both solutions was started at the same time. The flow rate of each solution is as shown in Table 6.

TABLE 6

| Total Flow Rate | Flow Rate of Buffer (mL/min) | Flow Rate of Solubilized Solution of Denatured Protein (mL/min) |
|---|---|---|
| 10 mL/min | 9.5 mL/min | 0.5 mL/min |
| 20 mL/min | 19.0 mL/min | 1.0 mL/min |
| 30 mL/min | 28.5 mL/min | 1.5 mL/min |
| 40 mL/min | 38.0 mL/min | 2.0 mL/min |

(Results)

Table 7 shows a comparison of the conditions of the solution in the reactor before feeding under each condition. Under the conditions that the inside of the reactor was replaced with water, the yields were generally low, although there was some fluctuation. This is considered that while the refolding was promoted by diluting the denaturant concentration with the water in the reactor inside the micromixer, the solution state was not suitable for refolding, and thus the formation of aggregates was promoted. On the other hand, stable refolding yields were successfully obtained under the conditions that the inside of the reactor was replaced with a denaturant.

TABLE 7

Comparison of Yields under Various Conditions

| Total Flow Rate | Solution in Reactor Before Liquid Feeding | Monomer Yield (Target Product) | Aggregate Yield (Byproduct) | Dimer Yield (Byproduct) |
|---|---|---|---|---|
| 10 mL/min | Water | 13.1 | 86.2 | 0.7 |
| 10 mL/min | 8M Guanidine Solution | 87.7 | 0.0 | 12.3 |
| 20 mL/min | Water | 83.4 | 14.2 | 2.4 |
| 20 mL/min | 8M Guanidine Solution | 89.2 | 0.0 | 10.8 |
| 30 mL/min | Water | 25.0 | 74.1 | 0.9 |
| 30 mL/min | 8M Guanidine Solution | 90.2 | 0.0 | 9.8 |
| 40 mL/min | Water | 22.6 | 76.6 | 0.8 |
| 40 mL/min | 8M Guanidine Solution | 91.2 | 0.0 | 8.8 |

Example 6

In Example 6, the mixing time of the flow microreactor and the static mixer were compared.

In Patent No. 848 cited above, the mixing time of the denatured protein solution and the buffer is about 1 msec to about 10 sec. Therefore, using a model protein, the mixing time was estimated by a method of quantifying the mixing time by pressure loss.

(Calculation Method)

In the report of Falk et al. (Chemical Engineering and Processing 50 (2011) 979-990), it is shown that the mixing time tm correlates with the energy dissipation rate $\varepsilon$, and it is shown that the mixing time tm can be shown by the following formula $$tm = 0.15 \varepsilon^{-0.45} \quad (I)$$

($\varepsilon = Q\Delta P/\rho V$, Q: flow rate, $\Delta P$: pressure loss, $\rho$: density, V: mixer volume). The mixing performance was evaluated using this method.

(Conditions)

<Examination of Production of Refolded Protein by Model Protein>

Liquid feeding system: continuous liquid feeding apparatus (equipped with flow rate and pressure gauge)

Micromixer: inner diameter 0.5 mm, V-shaped, mixer volume V: $1.9 \times 10^{-9}$ m$^3$)

Flow rate Q: 100 mL/min

Pressure loss $\Delta P$: 6 to 7 MPa

Density $\rho$: 1000 kg/m$^3$

The above data was substituted into formula (I) to calculate the mixing time tm.

<Patent No. 848>

A three-way connector, a static mixer, and a silicon tube (inner diameter 5 mm×80 cm) were used in accordance with the description of the Examples of Patent No. 848. Since the patent did not specify the inner diameter of the three-way connector, it was estimated that a ¼ inch (inner diameter 6.35 mm) connector was used, which was inferred from the inner diameter of the silicon tube. When the pressure loss was measured based on the Examples, it was about 20 kPa (=0.02 MPa).

(Results)

Figure 8:
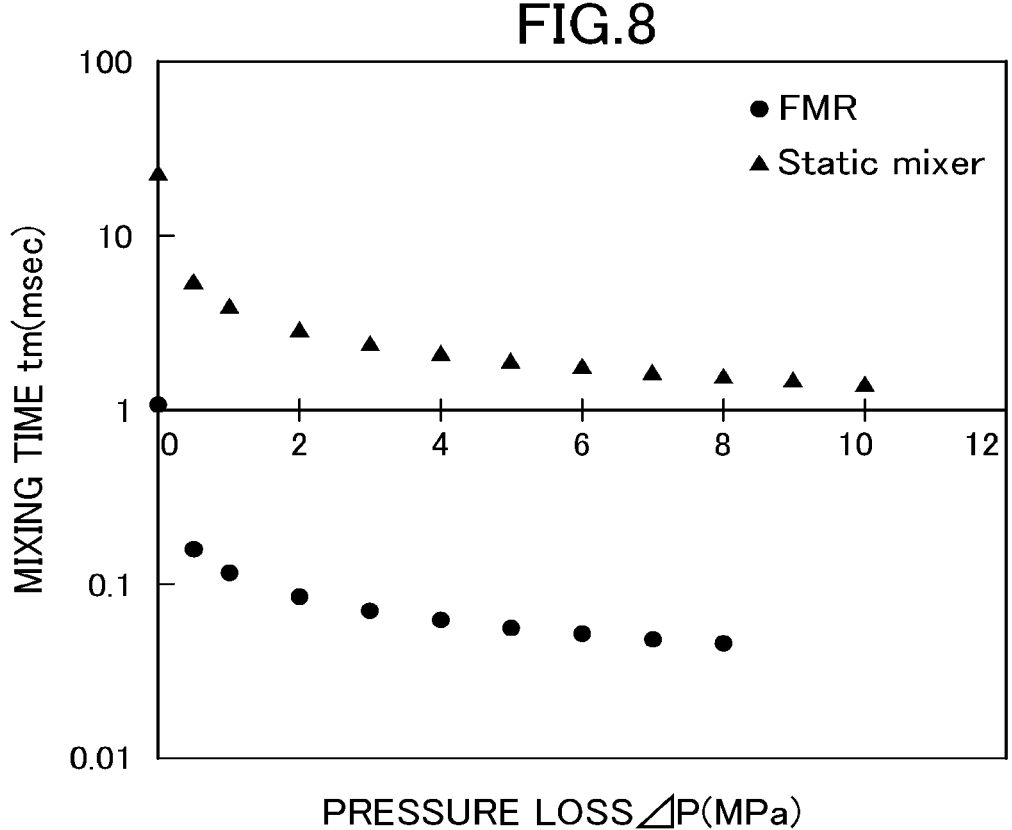
FIG. 8 shows a comparison of the mixing time between the method of Patent No. 848 and the method of the present invention measured in Example 6 in terms of the mixing time with respect to the pressure loss.

FIG. 8 shows a plot of the mixing time for the pressure loss $\Delta P$. It was estimated that the mixing time was about 0.05 msec (=50 usec) under the conditions performed in protein refolding by the model protein (6 to 7 MPa). It was also found that the pressure loss of 1 msec was 8 kPa (=0.008 MPa). From this, it is considered that the conditions used in FMR production are outside the scope of disclosure in Patent No. 848. On the other hand, in the plot based on Patent No. 848, it was found that the mixing performance was significantly reduced compared to the FMR. The mixing time at the pressure loss of 8 kPa was 22.68 msec, and it was as a result inferred that the mixing performance was significantly low. It is necessary to apply a pressure of about 15 MPa in order to obtain a mixing performance of 1 msec or less.

Example 7

In Example 7, the mixing performance of the flow microreactor and the static mixer was compared.

In patent No. 848, mixing is performed using a static mixer. Therefore, the mixing performance of the flow microreactor and the static mixer was evaluated by the Dushman reaction (using the competitive reaction of neutralization reaction and reduction reaction, Ehrfeld, W. et al.; Ind. Eng. Chem. Res. 38 1075-1082 (1999)), which is one of the methods of evaluating the mixing performance.

(Reaction Principle)

The difference in reaction rate between the neutralization of boric acid and the reduction reaction of iodine is used. When the mixing speed is high, the reaction (1) proceeds and no color is developed. On the other hand, when the mixing rate is slow, the solution turns yellow because the reaction (2) proceeds and $I^{3-}$ is produced.

$$H_2BO_3^- + H^+ \leftrightarrow H_3BO_4 \quad (1)$$

$$5I^+IO_3^- + 6H^+ \leftrightarrow 3I_2 + 3H_2O \quad (2)$$

$$I_2 + I^- \leftrightarrow I^{3-} \quad (3)$$

(Method)

Solutions 1 and 2 having the compositions shown in Table 8 were prepared, and the two solutions were mixed at 1:1 with an FMR or a static mixer, and then the absorbance at 352 nm was measured with an absorptiometer. Note that as the FMR apparatus, the type shown in FIG. 2 (the micromixer is type 3 in Table 1) was used.

TABLE 8

| Solution 1 | | | Solution 2 | | |
|---|---|---|---|---|---|
| HCl | 0.030 | mol/L | H3BO3 | 0.090 | mol/L |
| | | | NaOH | 0.090 | mol/L |
| | | | KI | 0.032 | mol/L |
| | | | KIO3 | 0.006 | mol/L |

(Results)

Figure 9:
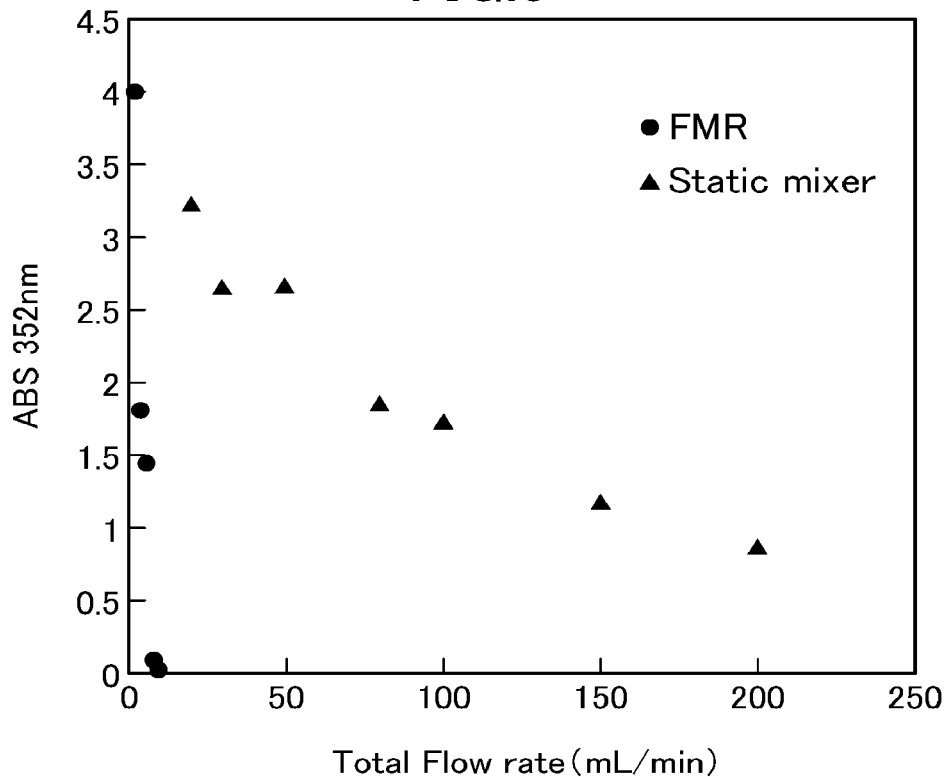
FIG. 9 shows a comparison of the mixing performance of the method of Patent No. 848 and the method of the present invention measured in Example 7 in terms of the absorbance at 352 nm with respect to the flow rate.

FIG. 9 shows a comparison of the absorbance at 352 nm with respect to the flow rate. While the absorbance in FMR was almost 0 under the condition of 10 mL/min or more, it was about 0.9 even at 200 mL/min, the maximum condition of the liquid feeding apparatus used this time, although the absorbance decreased under the conditions assumed from the description of the Examples of Patent No. 848.

Example 8

In Example 8, the monomer yields of the flow microreactor using rhIL-6 and the static mixer were compared.

In Patent No. 848, protein refolding is performed by a continuous process using a static mixer (hereinafter referred to as "CFR"). Therefore, using the IL-6 refolding model, the monomer yields of FMR and CFR were compared.

(Experimental Method)

The denatured IL-6 solution A prepared above was mixed with buffer (50 mM sodium acetate, pH 5.0) (dilution ratio 20 times). The mixing method was FMR, CFR, or Batch. The mixing conditions are shown in Table 9.

After mixing, the sample was allowed to stand for 1 or 24 hours and then subjected to gel filtration chromatography to calculate the monomer/dimer ratio. The quantification of rhIL-6 that had formed the monomer and dimer was carried out in the same manner as in Example 1. Note that in this system, aggregates, trimers, and tetramers were not produced, and there were mostly dimers when refolding failed, and thus the yield of refolded protein was evaluated by the monomer/dimer ratio.

TABLE 9

| | Mixing Conditions | | | |
|---|---|---|---|---|
| No. | Mixing Method | Mixer | Flow Rate of Buffer | Flow Rate of rhIL-6 Solution |
| C1 | FMR | Type 3 | 2.375 mL/min | 0.125 mL/min |
| C2 | FMR | | 4.75 mL/min | 0.25 mL/min |
| 3 | FMR | | 9.5 mL/min | 0.5 mL/min |
| 4 | FMR | | 19.0 mL/min | 1.0 mL/min |
| 5 | FMR | | 38.0 mL/min | 2.0 mL/min |
| C6 | Batch | (10 mL Scale) | — | — |
| C7 | CFR | Static Mixer | 19.0 mL/min | 1.0 mL/min |
| C8 | CFR | | 38.0 mL/min | 2.0 mL/min |
| C9 | CFR | | 76.0 mL/min | 4.0 mL/min |

(Results)

Figure 10:
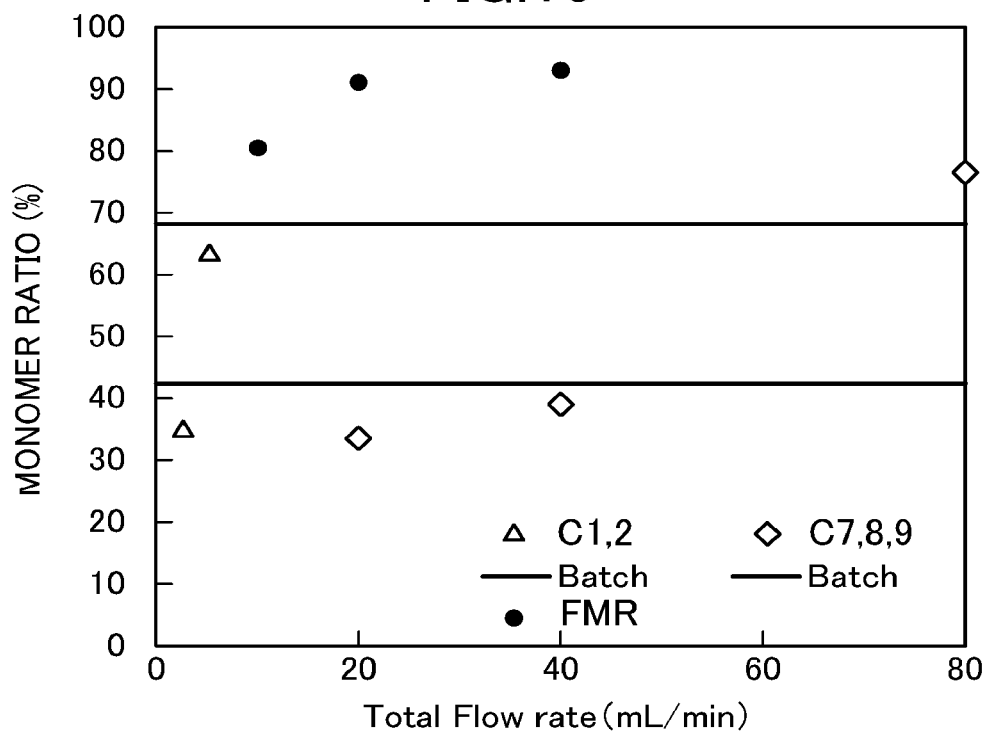
FIG. 10 shows the rhIL-6 monomer yield at various flow rates for the method of Patent No. 848, the method of the present invention, and the batch method measured in Example 8.

Table 10 and FIG. 10 show the results. Table 10 shows the analysis results of gel filtration chromatography, and FIG. 10 shows a comparison of the monomer ratio with respect to the flow rate. In Batch, the monomer ratio is 48% to 68%, which is a large fluctuation. On the other hand, in FMR, the results under 2.5 and 5.0 mL/min conditions were equal to or less than those under Batch conditions. This reproduces the result of the Dushman reaction. On the other hand, the result under the condition of 10 mL/min or more exceeded the Batch result. Meanwhile, under the condition of CFR, even when the flow rate was increased, the monomer ratio was 80% or less, which did not exceed the FMR. From the above results, it has been confirmed that FMR is a method that exceeds the mixing rate of CFR.

TABLE 10

| | SEC Analysis Results | | | | |
|---|---|---|---|---|---|
| | | | Day 0 (1 hr) Yield (%) | | Day 1 (24 hr) Yield (%) |
| No. | Mixing Method | Total Flow Rate of Buffer and rhIL-6 | Monomer | Dimer | Monomer | Dimer |
| C1 | FMR | 2.5 mL/min | 24.8 | 75.2 | 35.1 | 64.9 |
| C2 | FMR | 5 mL/min | 58.5 | 41.5 | 63.3 | 36.7 |
| 3 | FMR | 10 mL/min | 78.6 | 21.4 | 79.9 | 20.1 |
| 4 | FMR | 20 mL/min | 90.7 | 9.3 | 90.4 | 9.6 |
| 5 | FMR | 40 mL/min | 92.5 | 7.5 | 93.0 | 7.0 |
| C6 | Batch | — | 48 | 52 | 48 | 52 |
| | | | 67.8 | 32.2 | 68.5 | 31.5 |
| C7 | CFR | 20 mL/min | 33.2 | 66.8 | 35.1 | 64.9 |
| C8 | CFR | 40 mL/min | 38.8 | 61.2 | 39.9 | 60.1 |
| C9 | CFR | 80 mL/min | 75.9 | 24.1 | 75.9 | 24.1 |

C1, C2, C6 to C9: Comparative Examples

[Example 9] Activin a Refolding (Strain•Culture)

A strain was constructed in which a synthetic gene encoding activin A in a commercially available pET vector was inserted into E. coli BL21 strain. The strain was seed-cultured in LB medium and then cultured in Select Soytone medium. After collecting a culture broth, centrifugation was performed to collect the bacterial cells.

(Preparation of Insoluble Granules)

The collected bacterial cells were crushed while being cooled by an ultrasonic crusher, and then centrifuged again to collect the precipitated fraction. Washing with buffer was performed if necessary.

(Preparation of Refolding Raw Materials)

The insoluble granules were suspended with a denaturant and a reducing agent. The denaturant was added to 8 M urea and the reducing agent to 100 mM DTT. After standing, centrifugation was performed to collect the supernatant, and then DTT was removed by a Sephadex G-25 column.

(FMR Refolding)

The denatured activin A solution prepared above and the buffer (0.75% taurodeoxycholic acid, 0.75 M urea, 10 mM EDTA, 20 mM Tris HCl, 1.5 mM cysteine, 0.1 mM cystine) were mixed with an FMR apparatus to prepare an activin A refolding solution. A type 5 (V type, inner diameter 1.0 mm) micromixer was used, and refolding was performed at total flow rates of 50 mL/min and 200 mL/min.

(Batch Refolding)

The denatured activin A solution prepared above and the buffer were mixed in a container to prepare an activin A refolding solution. Refolding was performed on reaction scales 1 L and 5 L.

(Quantification of Activin A)

After concentrating the sample refolded by FMR or Batch, buffer exchange was performed. Then, activin A was quantified by reverse phase HPLC Vydac214 TP54 (developing solvent: solution A 0.1%-TFA, solution B 0.1%-TFA, 80% acetonitrile solution, ultraviolet absorption at detection method 280 nm; quantification standard, purified activin A).

(Results)

Table 11 shows a comparison of activin A yields at various scales. In Batch refolding, it was confirmed that the yield tended to decrease with upscaling, whereas when refolding was performed using FMR, it was confirmed that the yield tended to be successfully maintained. From this, it has been confirmed that the refolding by FMR at the time of upscaling is superior.

TABLE 11

| Reaction Scale | 1.0 L | 5.0 L |
| --- | --- | --- |
| Batch | 13.7% | 8.7% |
| FMR, Total Flow Rate | 50 mL/min | 200 mL/min |
| FMR | 16.1% | 15.1% |

[Example 10] T3GF-β Refolding

A strain was constructed in which a synthetic gene encoding TGF-β3 in a commercially available pET vector was inserted into E. coli BL21 strain. The strain was cultured in LB medium, and after collecting a culture broth, centrifugation was performed to collect the bacterial cells.

(Preparation of Insoluble Granules)

The collected bacterial cells were crushed while being cooled by an ultrasonic crusher, and then centrifuged again to recover the precipitated fraction. Washing with buffer was performed if necessary.

(Preparation of Refolding Raw Materials)

The insoluble granules were suspended with a denaturant. The denaturant was added to a 7.8 M urea solution.

(FMR Refolding)

The denatured TGF-β3 solution prepared above and the buffer (4% CHAPS, 1.0 M ArgHCL, 0.5 M Urea, 1 mM EDTA, 3 mM Cys) were mixed with an FMR apparatus to prepare a TGF-β3 refolding solution. A type 5 (V type, inner diameter 1.0 mm) micromixer was used, and refolding was performed at total flow rates of 7.5 mL/min and 22.5 mL/min.

(Batch Refolding)

The denatured TGF-β3 solution prepared above and the buffer were each mixed in a container to prepare a T3GF-β refolding solution. Refolding was performed on a reaction scale 10 mL.

(Quantification of TGF-β3)

For the refolding sample, the buffer was replaced twice (1st dilution: 20 mM Tris HCl, 0.5 M urea, 1 M NaCl, 1 mM EDTA (pH 7.5), 2nd dilution: 20 mM Tris HCl, 0.5 M urea, 1 M NaCl, 1 mM EDTA, (pH 7.5)).

The obtained sample was subjected to gel filtration HPLC (column, Superdex 75 10/300 GL, manufactured by GE Healthcare; developing solution 0.1 M sodium phosphate, 0.2 M arginine hydrochloride, 1 M urea, pH 6.8; flow rate 0.8 mL/min; detection method, UV absorption at 225 nm and 280 nm; quantitative standard, purified TGF-β3) to quantify TGF-β3 having a dimer structure formed therein.

(Results)

Table 12 shows a comparison of TGF-β3 yields under various conditions. It was confirmed that the yield of refolding in Batch was about 1.8%, while that of FMR refolding was 10.0% and 12.1%, and the yield was improved by using FMR. From this, it has been confirmed that the refolding by FMR is superior.

TABLE 12

|  |  | Yield (%) |
| --- | --- | --- |
| Batch | 10 mL | 1.8 |
| FMR | 7.5 mL/min | 10.0 |
| FMR | 22.5 mL/min | 12.1 |

[Example 11] IGF-1 Refolding

IGF-1 is known to cause several states in the intramolecular S—S bond during refolding. In particular, the intramolecular SS bond crossed form (Ia) generated as an IGF-1 swap form does not return to the native form (Ib) and is known as an irreversible byproduct (Jamse, A. M., (1993) Biochemistry 32, 5203-5213). On the other hand, the precursor (Ic) of the native form (Ib) always becomes the native form (Ib) over time. It was decided to verify whether the formation of the above-mentioned crossed form could be suppressed by using the high-speed mixing system of FMR.

(Preparation of Denatured Sample)

A denatured IGF-1 solution sample was prepared with a solution of IGF-1 in 30 mM Tris HCl, 100 mM GSH, 8 M urea, and pH 12.

(FMR Refolding)

The denatured IGF-1 solution prepared above and the buffer (50 mM Tris, 0.56 M Arg, 10 mM GSSG, pH 5) were mixed with an FMR apparatus to prepare an IGF-1 refolding solution. A type 5 (V type, inner diameter 1.0 mm) micromixer was used, and refolding was performed at total flow rates of 15 and 22.5 mL/min.

(Batch Refolding)

The denatured IGF-1 solution prepared above and the buffer (50 mM Tris, 0.56 M Arg, 2.2 mM GSH, 2.2 mM GSSG, pH 5) were mixed in a container to prepare an IGF-1 refolding solution. Refolding was performed with a container scale 1 mL tube.

(Quantification of IGF-1)

The obtained sample was allowed to stand for 3 hours and then subjected to reverse phase HPLC (C8 column, manufactured by YMC; developing solvent: solution A 0.1%-TFA, solution B 0.1%-TFA, 80% acetonitrile solution, UV absorption at detection method 280 nm; quantitative standard, purified IGF-1) to quantify IGF-1 having a misfolded structure and a monomer structure of IGF-1.

(Results)

Figure 11:
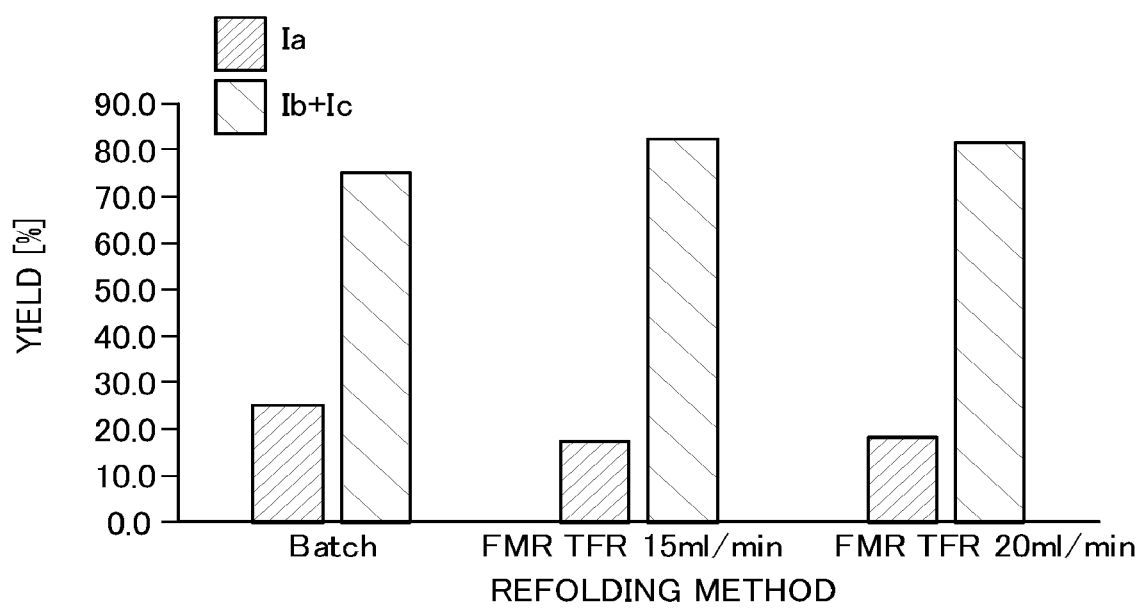
FIG. 11 shows a comparison between the total yield of (Ib) and precursor (Ic) of IGF-1 refolded by the method of the present invention or the batch method and the yield of IGF-1 (Ia) measured in Example 11.

A comparison of IGF-1 products under various conditions is shown in terms of the ratio between misfolded structure (Ia) and monomer structure (Ib, Ic). In Batch, the misfolded structure (Ia) was 25%, while under the FMR refolding conditions, it was 17% and 18%, respectively, confirming that the misfolded structure % was lower than in Batch. As described above, the precursor Ic always becomes the target product Ib over time. Therefore, the sum of Ib and Ic can be regarded as the finally obtained (obtainable) product. FIG. 11 is a graph comparing the total of Ib and Ic with the impurity Ia. This indicates that FMR refolding is more effective than IGF-1 refolding.

TABLE 13

Area Values of IGF under Various Conditions (Ia is Irreversible, Ib is Product, Ic is Precursor of Ib)

| | | Ia<br>IGF-Swap | Ib<br>Native | Ic<br>Unbridge |
|---|---|---|---|---|
| Batch | 3 hr | 37366 | 44133 | 68210 |
| FMR TFR 15 ml/min | 3 hr | 30068 | 56052 | 85345 |
| FMR TFR 20 ml/min | 3 hr | 27063 | 46974 | 74151 |

TABLE 14

Ratios % of Various Components (Ia is Misfolded Form)

| Ia<br>IGF-Swap | Ib<br>Native | Ic<br>Unbridge |
|---|---|---|
| 25.0 | 29.5 | 45.6 |
| 17.5 | 32.7 | 49.8 |
| 18.3 | 31.7 | 50.0 |

[Example 12] Ranibizumab Refolding (Preparation of Denatured Sample)

Addition was performed to a solution of Ranibizumab (FAB fragment of antibody) to 5 mM DTT and allowed to stand at 37° C. for 60 minutes. Subsequently, the denaturing solutions were mixed so as to have 6.0 M GdnHCl, 7.5 mM EDTA, 75 mM Tris, and 1.25 mM DTT, and the mixture was allowed to stand at 37° C. for 15 min and then allowed to stand at 5° C. overnight.

(FMR Refolding)

The denatured Ranibizumab solution prepared above and the buffer (0.5 M ArgHCl, GSH 0.22 mM, GSSG 0.22 mM) were mixed with an FMR apparatus to prepare a Ranibizumab refolding solution. A type 5 (V type, inner diameter 1.0 mm) micromixer was used, and refolding was performed at a total flow rate of 10 mL/min.

(Batch Refolding)

The denatured Ranibizumab solution prepared above and the buffer (0.5 M ArgHCl, GSH 0.22 mM, GSSG 0.22 mM) were mixed in a test tube to prepare a Ranibizumab refolding solution. Refolding was performed at volumes of 1 mL and 10 mL.

(Quantification of Ranibizumab)

After concentration with an ultrafiltration filter, the obtained sample was subjected to gel filtration HPLC (column, Superdex 75 10/300 GL, manufactured by GE Healthcare; developing solution 0.1 M sodium phosphate, 0.2 M arginine hydrochloride, 1 M urea, pH 6.8; flow rate 0.8 mL/min; detection method, UV absorption at 225 nm and 280 nm; quantitative standard, purified Ranibizumab) to quantify Ranibizumab.

(Results)

Figure 12:
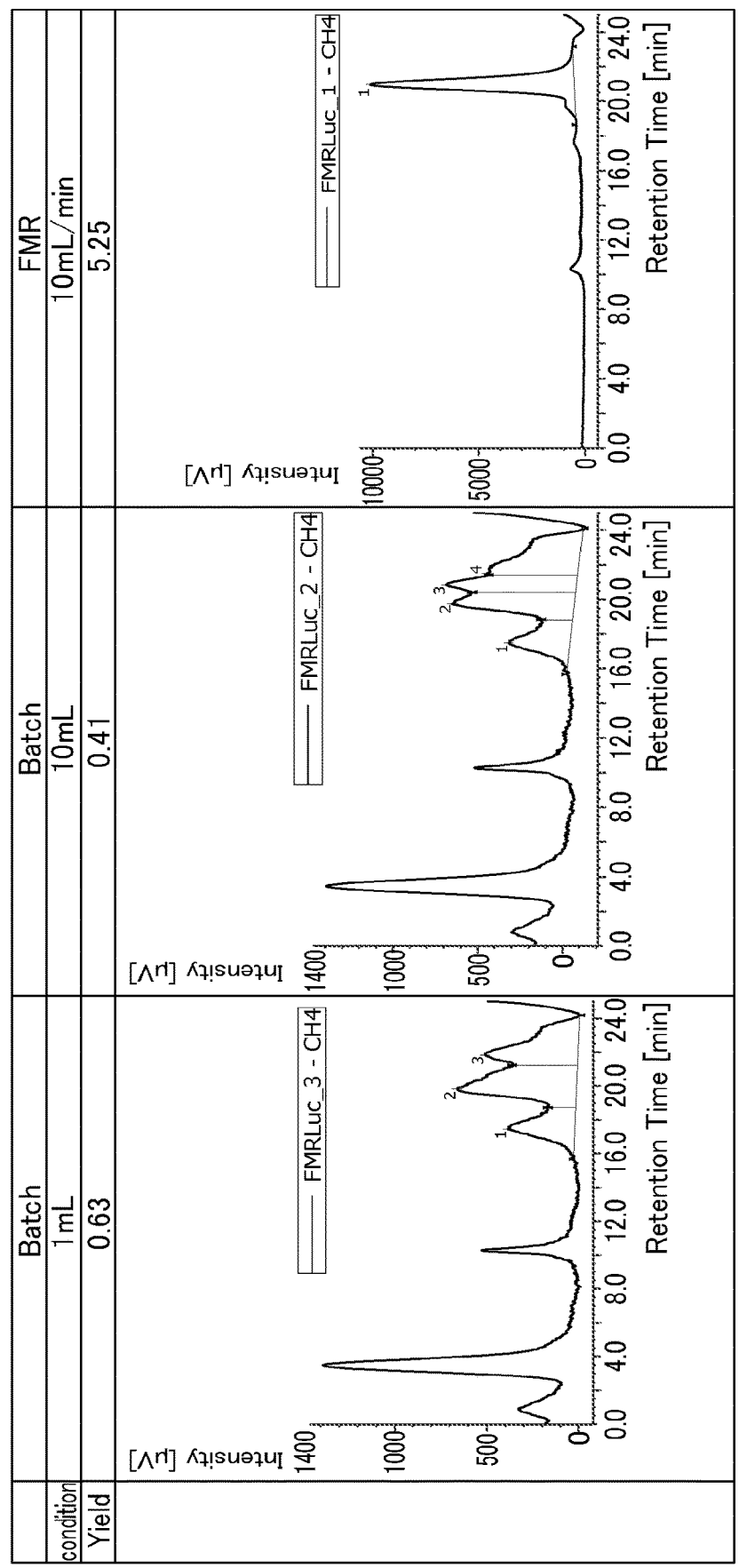
FIG. 12 shows a comparison of yields of Ranibizumab refolded by the method of the present invention or the batch method measured in Example 12.

FIG. 12 shows a comparison of Ranibizumab yields under various conditions. In Batch refolding, many misfolded forms were detected in addition to Ranibizumab, resulting in a yield of 0.41, 0.69%. On the other hand, under the FMR refolding condition, the yield improved to 5.25%. This indicates that FMR refolding is more effective than Ranibizumab refolding.

[Example 13] Examination of Flow Rate UP Conditions (FMR Refolding)

The denatured rhIL-6 solution A prepared above and the buffer (50 mM AcONa, pH 5.0) were mixed with an FMR apparatus to prepare a rhIL-6 refolding solution. A type 5 (V type, inner diameter 1.0 mm) micromixer was used, and refolding was performed at total flow rates of 10, 50, 100, 300 mL/min.

(Quantification of rhIL-6)

The obtained sample was subjected to gel filtration HPLC (column, Superdex 75 10/300 GL, manufactured by GE Healthcare; developing solution 0.1 M sodium phosphate, 0.2 M arginine hydrochloride, 1 M urea, pH 6.8; flow rate 0.8 mL/min; detection method, UV absorption at 225 nm and 280 nm; quantitative standard, purified rhIL-6) to quantify rhIL-6.

(Results)

It has been found that even under the condition that the total flow rate is 10, 50, 100, 300 mL/min and the inner diameter of the micromixer is 1.0 mm, the formation of aggregates can be suppressed and the yield can be improved by high-speed mixing by FMR.

TABLE 15

| | Dilution rate (Times) | Flow rate (mL/min) | Monomer Yield (mol %) | Dimer Yield (mol %) | Recovery (mol %) |
|---|---|---|---|---|---|
| Batch | 20 | 10 mL scale | 65.4 | 13.4 | 78.8 |
| FMR V1.0 | 20 | 10 mL/min | 68.2 | 31.2 | 99.4 |

TABLE 15-continued

| | Dilution rate (Times) | Flow rate (mL/min) | Monomer Yield (mol %) | Dimer Yield (mol %) | Recovery (mol %) |
|---|---|---|---|---|---|
| FMR V1.0 | 20 | 50 mL/min | 81.8 | 16.7 | 98.5 |
| FMR V1.0 | 20 | 100 mL/min | 81.8 | 16.9 | 98.7 |
| FMR V1.0 | 20 | 300 mL/min | 91.2 | 4.8 | 96.0 |

[Example 14] Estimation of Mixing Time

The mixing time of each micromixer was calculated by the method based on Example 6. A mixing performance evaluation system including a syringe, a syringe pump, a pressure sensor, and a micromixer (V-shaped inner diameter 1.0 mm) was constructed (in accordance with to FIG. 3). Water was fed at 5 to 80 mL/min in the constructed system, and the pressure loss generated at that time was measured. Estimated values of pressure loss and mixing time at each flow rate were calculated. Table 16 shows the results. From this result, it is estimated that the mixing time is 1 msec or less at 15 ml/min or more.

TABLE 16

| Flow Rate (mL/min) | Pressure Loss (kPa) | Mixing Time (msec) |
|---|---|---|
| 5 | 1.0 | 2.86 |
| 8 | 2.1 | 1.66 |
| 10 | 2.7 | 1.34 |
| 11 | 3.1 | 1.21 |
| 12 | 3.5 | 1.10 |
| 13 | 3.8 | 1.02 |
| 15 | 4.7 | 0.87 |
| 20 | 7.2 | 0.63 |
| 30 | 13.9 | 0.39 |
| 10 | 2.7 | 1.34 |
| 12 | 3.5 | 1.10 |
| 14 | 4.2 | 0.94 |
| 16 | 5.0 | 0.82 |
| 18 | 5.9 | 0.72 |
| 19 | 6.7 | 0.67 |
| 20 | 7.2 | 0.63 |
| 24 | 9.6 | 0.51 |
| 26 | 10.4 | 0.47 |
| 28 | 11.9 | 0.43 |
| 30 | 13.9 | 0.39 |
| 50 | 30.6 | 0.22 |
| 80 | 65.6 | 0.12 |

Furthermore, in order to measure the pressure loss in the high flow rate region, a mixing performance evaluation system including a plunger pump, a pressure sensor, and a micromixer was constructed, and the pressure loss when water was fed in the region of 100 to 600 mL/min was measured by the constructed system, and the mixing time was estimated therefrom. V-shaped and T-shaped mixers were used, and those with inner diameters of 1.0 mm, 0.5 mm, and 0.25 mm were used. A comparison of pressure loss and mixing time is shown in Tables 17 and 18 below. The pressure loss tended to increase and the estimated mixing time tended to decrease in a manner dependent on the flow rate. It was also confirmed that the smaller the inner diameter, the longer the mixing time.

TABLE 17

| | | Pressure Loss (Mpa) | | | |
|---|---|---|---|---|---|
| Mixer Shape Inner Diameter (mm) | | V-Shape 1.0 | T-Shape 1.0 | V-Shape 0.5 | V-Shape 0.25 |
| Flow Rate | 100 mL/min | 0.50 | 0.50 | 0.52 | 1.40 |
| | 200 mL/min | 1.42 | 1.37 | 1.50 | 3.31 |
| | 300 mL/min | 2.60 | 2.56 | 2.91 | 5.59 |
| | 400 mL/min | 4.29 | 4.03 | 4.77 | 8.51 |
| | 500 mL/min | 6.88 | 6.46 | 7.39 | Not Tested |
| | 600 mL/min | 9.50 | 9.03 | 8.34 | Not Tested |

TABLE 18

| | | Mixing Time (msec) | | | |
|---|---|---|---|---|---|
| Mixer Shape Inner Diameter (mm) | | V-Shape 1.0 | T-Shape 1.0 | V-Shape 0.5 | V-Shape 0.25 |
| Flow Rate | 100 mL/min | 0.045 | 0.045 | 0.017 | 0.004 |
| | 200 mL/min | 0.021 | 0.021 | 0.008 | 0.002 |
| | 300 mL/min | 0.013 | 0.013 | 0.005 | 0.001 |
| | 400 mL/min | 0.009 | 0.009 | 0.003 | 0.001 |
| | 500 mL/min | 0.007 | 0.007 | 0.003 | Not Tested |
| | 600 mL/min | 0.005 | 0.006 | 0.002 | Not Tested |

The invention claimed is:

1. A protein refolding apparatus, comprising:
a first flow path through which a buffer circulates;
a second flow path through which a solubilized solution of a protein which has become insoluble or lost a higher-order structure thereof circulates; and
a V-shaped micromixer having an inner diameter Y of 0.25 to 1.0 mm in which the first flow path and the second flow path are combined and mixed,
wherein the micromixer is configured for bringing buffer having a flow rate of X1 mL/min into contact with the solubilized solution having a flow rate of X2 mL/min, a relationship between X1 and Y is shown by the following formula (1), and
a relationship between X1 and X2 is shown by the following formula (2):

$$Y \leq \tfrac{1}{180} X1 + \tfrac{4}{5} \quad (1)$$

where $20 \leq X1 \leq 300$, and $$X2 \leq \tfrac{1}{10} X0 \quad (2), \text{ and}$$

wherein the micromixer is configured for providing a mixing time of from 10 microseconds to 1,000 microseconds.

2. The apparatus according to claim 1, further comprising: a syringe pump, a plunger pump, or a diaphragm pump for feeding a buffer and a solubilized solution of protein.

3. The apparatus according to claim 1, further comprising a pump for feeding the buffer and the solubilized solution of protein at a pressure at which a total of a flow rate of the buffer and a flow rate of the solubilized solution is about 5 mL/min or more.

4. The apparatus according to claim 1, further comprising a pump for feeding the buffer and the solubilized solution of protein at a pressure at which the total of the flow rate of the buffer and the flow rate of the solubilized solution is about 1650 mL/min or less.

5. The apparatus according to claim 1, further comprising a pump for feeding the buffer and another pump for feeding the solubilized solution of protein.

* * * * *